US011407587B1

(12) United States Patent
Dwivedi et al.

(10) Patent No.: US 11,407,587 B1
(45) Date of Patent: Aug. 9, 2022

(54) AUTOMATED CONTAINER RETRIEVAL AND DELIVERY SYSTEMS

(71) Applicant: Amazon Technologies, Inc., Seattle, WA (US)

(72) Inventors: Rajeev Dwivedi, Sammamish, WA (US); Ganesh Krishnamoorthy, Seattle, WA (US); Mohit Malik, Seattle, WA (US); Shahid Azad, Seattle, WA (US); Vivek S. Narayanan, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 29 days.

(21) Appl. No.: 16/673,195

(22) Filed: Nov. 4, 2019

(51) Int. Cl.
| B65G 1/04 | (2006.01) |
| B65G 1/06 | (2006.01) |
| B65G 47/90 | (2006.01) |
| B65G 7/12 | (2006.01) |
| B65G 67/30 | (2006.01) |
| B65G 47/06 | (2006.01) |

(52) U.S. Cl.
CPC ............ *B65G 1/0435* (2013.01); *B65G 1/065* (2013.01); *B65G 47/902* (2013.01); *B65G 7/12* (2013.01); *B65G 47/06* (2013.01); *B65G 67/30* (2013.01); *B65G 2201/0258* (2013.01); *B65G 2813/023* (2013.01)

(58) Field of Classification Search
CPC ........ B65G 1/0435; B65G 1/06; B65G 1/065; B65G 1/1375; B65G 47/902; B65G 2201/0258

USPC .................................................. 414/276, 280
See application file for complete search history.

(56) References Cited

U.S. PATENT DOCUMENTS

| 1,703,773 | A | * | 2/1929 | Lee | .......... | B65G 1/08 |
| | | | | | | 193/38 |
| 3,750,804 | A | * | 8/1973 | Lemelson | ............ | B65G 1/0435 |
| | | | | | | 414/276 |
| 3,805,974 | A | * | 4/1974 | Andersson | ............. | B65G 37/00 |
| | | | | | | 414/276 |
| 4,307,988 | A | * | 12/1981 | Page | ....................... | B65G 1/08 |
| | | | | | | 198/465.4 |
| 4,394,104 | A | * | 7/1983 | Camerini | ............. | B65G 1/0435 |
| | | | | | | 414/276 |
| 7,128,521 | B2 | * | 10/2006 | Hansl | ................... | B65G 1/0435 |
| | | | | | | 414/807 |
| 8,790,061 | B2 | * | 7/2014 | Yamashita | ........... | B65G 1/0492 |
| | | | | | | 414/280 |
| 9,221,607 | B2 | * | 12/2015 | Marti | ....................... | B65G 1/08 |
| 9,718,617 | B2 | * | 8/2017 | Koide | .................. | B65G 1/0435 |

(Continued)

*Primary Examiner* — James Keenan
(74) *Attorney, Agent, or Firm* — Eversheds Sutherland (US) LLP

(57) ABSTRACT

Systems, methods, and apparatuses are disclosed for automated container retrieval and delivery systems. In one embodiment, an example container handling system may include a platform, a first rotatable arm disposed on a lower side of the platform, where the first rotatable arm is offset from a front end of the platform, a motor configured to rotate the first rotatable arm from a first position to a second position, and a first wheel disposed at a distal end of the first rotatable arm. The container handling system may be configured to raise a container from an angled position to a horizontal position, and the container may be in the horizontal position when the first rotatable arm is in the second position.

18 Claims, 13 Drawing Sheets

(56) References Cited

U.S. PATENT DOCUMENTS

| | | | |
|---|---|---|---|
| 10,173,838 B2 * | 1/2019 | Aschauer | B65G 1/0492 |
| 10,479,605 B2 * | 11/2019 | Ueda | B65G 1/0435 |
| 10,800,617 B2 * | 10/2020 | Ueda | B65G 59/06 |
| 2021/0139240 A1 * | 5/2021 | Kapust | B65G 1/1373 |

* cited by examiner

AUTOMATED CONTAINER RETRIEVAL AND DELIVERY SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, improvements in various operations of order fulfillment, such as improvements to picking technology, sorting technology, packing technology, and so forth may be desired, such that manual efforts can be redirected to different tasks.

Figure 1:
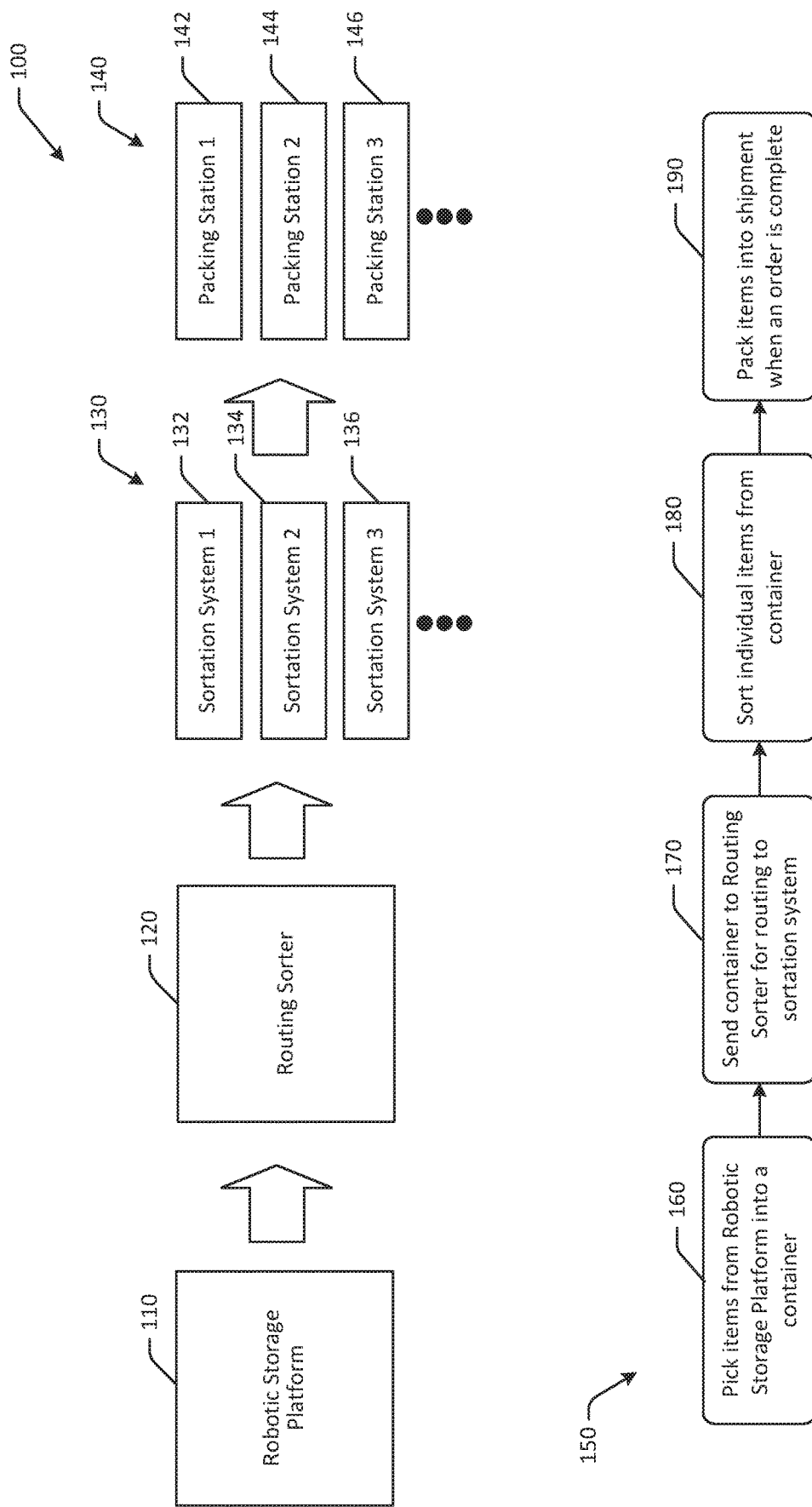
FIG. 1 is a hybrid schematic illustration of an example use case for automated container retrieval and delivery systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

In addition, handling and transport of containers, such as totes that are empty or have objects (e.g., items, packages, etc.) inside, may be difficult to perform using robotic components or other automated tools. For example, grasping a container in which an item is present may be difficult due to movement of the item (thereby causing a change to the center of gravity of the container, etc.) and/or other factors when using automated tools. Moreover, establishing control over a container in motion may be difficult when using automated tools. For example, as the container is moved, ensuring that the container and its contents (if applicable) arrive at a destination intact may be difficult when automated tools are used instead of manual effort. Although humans may be able to effectively handle and transport containers, automated tools may present challenges due to the complexity of the operations involved during retrieval, transport, and/or delivery of a container.

Embodiments of the disclosure include methods and systems for automated container retrieval and delivery systems that may be used to automatically retrieve, safely transport, and securely deliver containers while maintaining control over the container during each stage of interaction. In addition, some containers may be stored at an angle, so as to avoid buildup of items in the container at one end. For example, containers may be stored at an angle towards or away from an input side of the container, such that items input at the container may "roll" or otherwise move in a desired direction due to gravity. In such instances, automated retrieval and/or delivery of such containers may be more complex, as the container may be difficult to retrieve when at an angle. Some embodiments therefore include one or more flipper arms that may pivot or rotate upwards to reorient or reposition a container to a horizontal position prior to retrieval of the container. Embodiments may include telescoping arms or sidewalls that can be used to securely grasp the container, and one or more rotatable or pivotable fingers may be used to pull or push the container into a desired location, such as onto a mobile carrier unit or conveyor belt for transport. In some instances, empty containers, such as totes, may be delivered to a certain location in a fulfillment center. Once items are delivered to the container or the container is otherwise full, the container may be retrieved. Embodiments of the disclosure may provide the ability to handle containers that can be horizontal, inclined at an angle, that are of varying materials, etc. without relying on an external transportation mechanism like a gantry or a robot to provide any relative motion. Additionally, the items can be stored and retrieved in two or more directions of actuation.

Referring to FIG. 1, an example use case 100 for automated container retrieval and delivery systems and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

Figure 2:
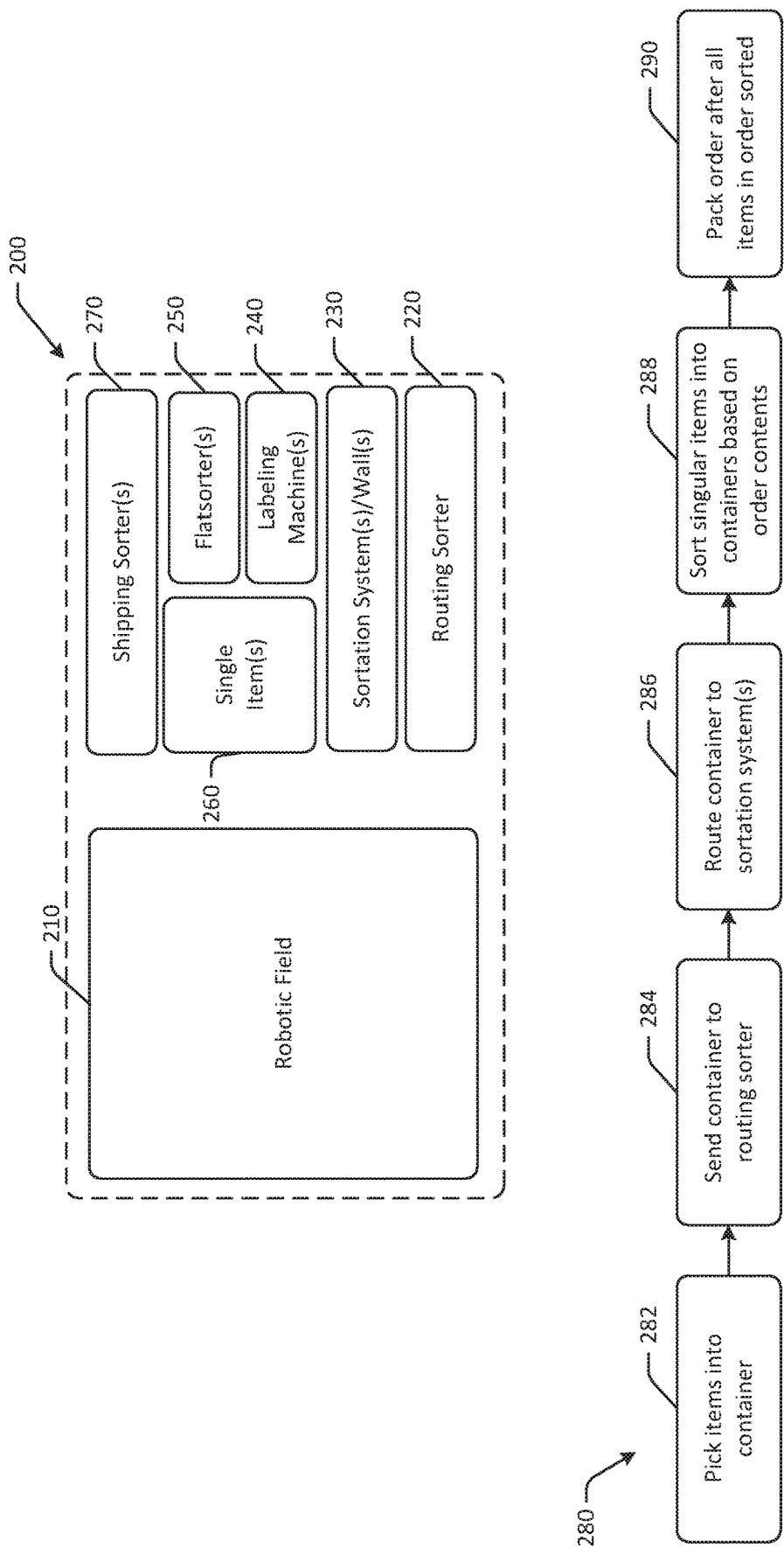
FIG. 2 is a hybrid schematic illustration of an example use case for automated container retrieval and delivery systems and an example process flow in accordance with one or more embodiments of the disclosure.

FIG. 2 is a hybrid schematic illustration of an example use case for automated container retrieval and delivery systems and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 280 for processing single or multi-item orders. At a first block 282, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 284, the tote may be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents. For example, the containers at the sortation system may be assigned to a particular order that may be single or multi-item. At a fifth block 290, the order may be packed after all items in the order are sorted.

The sortation system machines 220 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.).

Accordingly, in some embodiments, sortation systems may be arranged in rows and may receive assigned totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include automated container retrieval and delivery systems. Certain embodiments may improve processing speed and/or throughput of fulfillment centers. Certain embodiments may improve performance of mechanical equipment for sortation and/or consolidation of items for single or multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
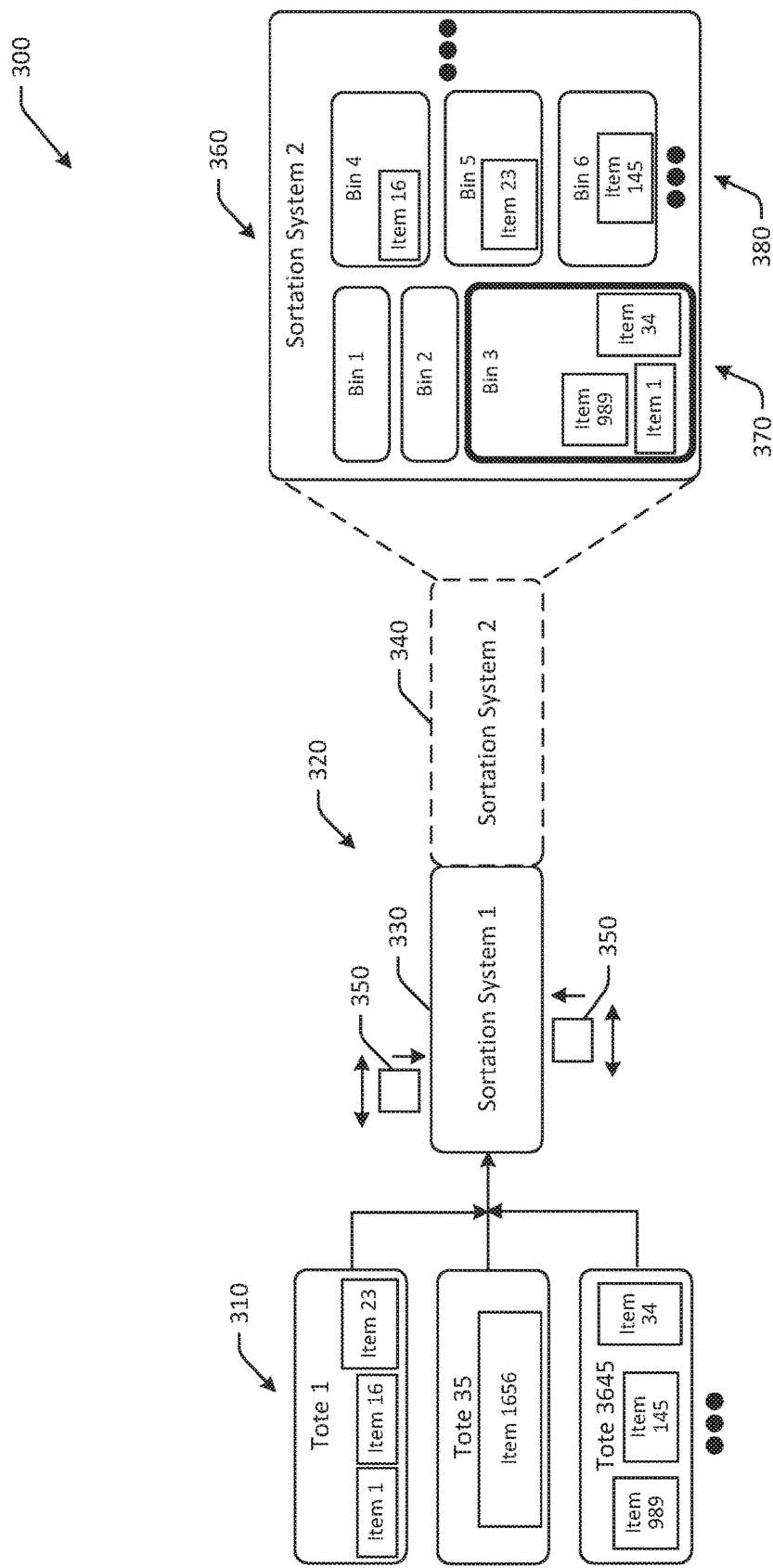
FIG. 3 is a schematic illustration of an item sorting system that may implement an automated container retrieval and delivery system in accordance with one or more embodiments of the disclosure.

FIG. 3 is a schematic illustration of an item sorting system that may implement an automated container retrieval and delivery system in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the same sortation system discussed with respect to FIGS. 1-2.

In FIG. 3, an example use case 300 including a set of totes 310 and item sorting system(s), or sortation system(s) 320, is depicted. The set of totes 310 may include one or more totes that may be assigned to, or otherwise associated with, the sortation system 320. For example, Tote 1, Tote 35, Tote 3645, and so forth may be associated with the sortation system 320. The totes may have identifiers, such as alpha-numeric or other identifiers. The totes may be used to place items that have been picked into the totes. The items that are placed in the totes may be associated with orders that are to be consolidated by the sortation system 320. For example, Tote 1 may include item 1, item 16, and item 23, Tote 35 may include item 1656, Tote 3645 may include item 989, item 145, and item 34, and so forth. The item sorting system, or the sortation system 320, may be configured to receive items from a tote that includes one or more, such as multiple items, and the tote may be routed to the item sorting system or the sortation system 320.

The totes 310 may be directed to the sortation system 320 for sorting and consolidation. For example, items in the totes 310 may be inducted into the sortation system 320 via a conveyor belt.

The sortation system 320 may include one or more modules, and may be adjusted in size by adding or removing modules or standalone sortation systems as needed. For example, the sortation system 320 may include a first sortation system 330 and a second sortation system 340. The second sortation system 340 may be coupled to the first sortation system 330, or may be a standalone sortation system.

The respective sortation systems 330, 340 may include one or more bins, or containers that hold items of a single or multi-item order. For example, as illustrated in side view 360, the second modular item sorting machine 340 may include a first chute 370, or vertical stacking, of bins, and a second chute 380 of bins. The bins in the respective chutes may be of different sizes or dimensions, or may be placed in different vertical locations along the chute. The containers may be stored at angled positions. The sortation system 320 may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles or mobile carrier units 350, which may move in one or more directions within the sortation system 320. In some embodiments, the shuttles or mobile carrier units 350 may be positioned outside of the sortation system 320. In some embodiments, the sortation system(s) 320 may include one or more mobile carrier units 350 or other shuttles that can be used to move items, such as products, packages, containers, and so forth. Mobile carrier units 350 may include one or more RFIDs that can be used to retain traceability of an item to a carrier, such that the entire system may not have to be purged in case of a complete power loss. The lineage or traceability can be established by associating a barcode or other identifier of the item with the carrier RFID tag at the point of induction or elsewhere.

For example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

Figure 4:
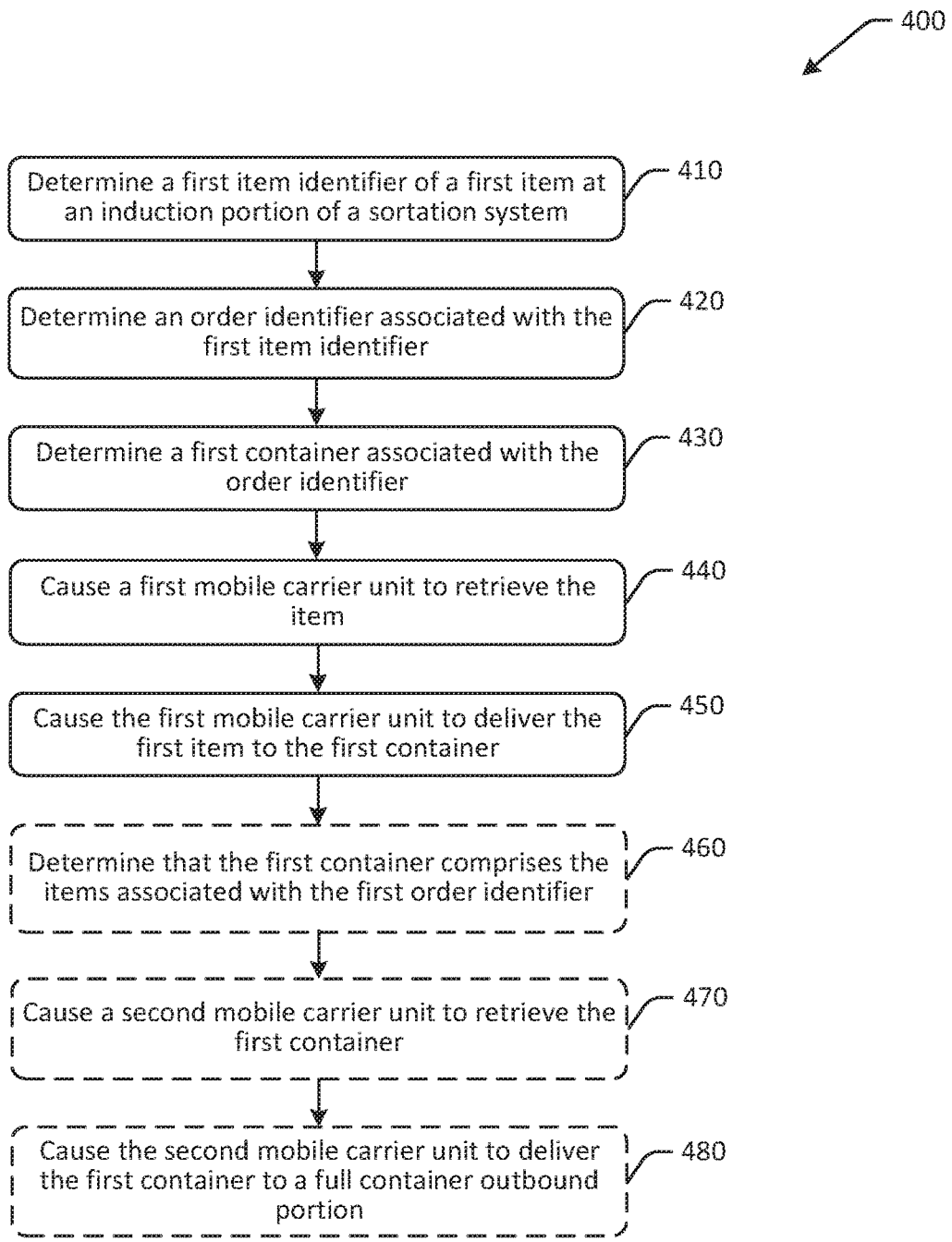
FIG. 4 is a schematic illustration of an example process flow for item sortation in accordance with one or more embodiments of the disclosure.

FIG. 4 is a schematic illustration of an example process flow 400 for item sortation in accordance with one or more embodiments of the disclosure. One or more of the blocks illustrated in FIG. 4 may be performed in a different order or across a distributed environment. In some embodiments, the operations of process flow 400 may be performed by a controller or computer system in communication with one or more sortation systems.

At block 410, a first item identifier of a first item at an induction portion of a sortation system may be determined. For example, a computer system or controller having one or more computer processors coupled to memory and configured to execute computer-executable instructions may be configured to determine a first item identifier of a first item at an induction portion of a sortation system. The first item identifier may be a barcode or other machine readable identifier. To determine the first item identifier, the computer system may determine the identifier using a scanner or other component. The first item identifier may be associated with a first item. The first item may be part of an order, such as an online order, and may therefore be associated with an order identifier. The induction portion of the sortation system may be a portion of the sortation system at which items or containers are input or fed into the sortation system. In some instances, the items or containers may be input manually, while in other instances, the items or containers may be automatically fed into the sortation system using materials handling equipment. The computer system may be local or remote relative to the sortation system, and may be in wired or wireless communication with one or more components of the sortation system. In some embodiments, determination of a first item may be completed using various inspection methods, such as weight scans (e.g., using a weight sensor to determine whether an item weight comports with an expected item weight, etc.) or volumetric scans (e.g., using computer vision point cloud to determine whether a size of an item comports with an expected item size, etc.) in addition to, or instead of, barcode scans as a secondary verification to ensure that the item is accurately identified. For example, a barcode scan may be inaccurate due to more than one label on an item or package, etc., so a secondary volumetric scan may provide additional verification. If secondary verification does not result in identification of the item, the item or package may be routed to a location for subsequent automated or manual inspection.

At block 420, an order identifier associated with the first item identifier may be determined. For example, the computer system may determine an order identifier associated with the first item identifier. The order identifier may be associated with each of the item identifiers in an order. The computer system may determine, for example using a database, the order identifier associated with the first item identifier. In some instances, the first item identifier may be associated with more than one order identifier. In such instances, the computer system may determine the order identifier that corresponds to the order that is being sorted by the sortation system, as opposed to a different sortation system.

At block 430, a first container associated with the order identifier may be determined. For example, the computer system may determine a first container associated with the order identifier. The sortation system may include a number of different containers, such as totes, bins, or bags, and the like. The containers may be used to aggregate items for certain orders, packages destined for similar destinations, and so forth. Accordingly, a single container may be associated with one or more order identifiers in some instances. The computer system may determine the first container that is located at the sortation system that is being used to aggregate items for the order identifier. The order identifier associated with a container may remain static until all of the items associated with the order are aggregated in the container.

At block 440, a first mobile carrier unit may be caused to retrieve the first item. For example, the computer system may be configured to cause a first mobile carrier unit to retrieve the item. The computer system may be in communication with one or more mobile carrier units. Mobile carrier units may be configured to retrieve items and/or deposit items into containers, retrieve and/or deposit empty containers into container slots, retrieve and/or deposit full or completed containers to an outbound portion of the sortation system, and so forth. The mobile carrier units may be configured to move about the sortation system using any suitable form of propulsion, such as motors, rollers, belts, mobile drive units, and so forth. Mobile carrier units may include components configured to move items and containers, such as rollers, arms, sidewalls, and/or other components. The computer system may send instructions or commands to a particular mobile carrier unit to retrieve the first item from the induction portion of the sortation system. The mobile carrier may therefore maneuver to the induction portion to retrieve or otherwise receive the first item.

At block 450, the first mobile carrier unit may be caused to deliver the first item to the first container. For example, the computer system may cause the first mobile carrier unit to deliver the first item to the first container. The computer system may send instructions or commands to the first mobile carrier unit to navigate to the designated first container, and to deposit or deliver the first item to the first container. The first mobile carrier unit may navigate to the first container using one or more ramps in some instances, or an elevator lift in other instances. For example, the computer system may cause a track-based pathway to configure a path on which the first mobile carrier unit can move to reach the first container. The first container may be on different levels of the sortation system, and the computer system may cause the first mobile carrier unit to follow the path and/or take an elevator to the appropriate level to reach the first container.

At optional block 460, it may be determined that the first container comprises the items associated with the first order identifier. For example, the computer system may determine that the first container comprises the items associated with the first order identifier. The first order identifier may be associated with one or more items, and may therefore be associated with one or more items. The computer system may determine that the one or more items are positioned in the first container. For example, all of the items in the order may have been placed into the first container by one or more mobile carrier units. For orders with multiple items, the computer system may determine that the order identifier is associated with a second item identifier of a second item, and may determine that the first container includes the first item and the second item. The computer system may therefore track items that are input and output from the sortation system, as well as the contents of respective containers during the sortation process. In some embodiments, the carrier units may be the same for both item delivery and tote extraction, whereas in other embodiments, the carrier units may be different for item delivery and tote extraction. For example, carrier units used for tote extraction may include additional or different hardware than carrier units used for item or package delivery to containers.

At optional block 470, a second mobile carrier unit may be caused to retrieve the first container. For example, the computer system may cause a second mobile carrier unit to retrieve the first container. In some instances, the second mobile carrier unit may be the same unit as the first mobile carrier unit, while in other instances, the second mobile carrier unit may be a different unit. To retrieve the first container, the mobile carrier unit may navigate to the container slot in which the first container is present, and may retrieve the first container. For example, the mobile carrier unit may pull the container out of the container slot, or the container slot may include hardware, such as a tilting floor, an extendable arm, powered rollers, or other hardware to push or deposit the container onto the mobile carrier unit.

At optional block 480, the second mobile carrier unit may be caused to deliver the first container to a full container outbound portion of the sortation system. For example, the computer system may cause the second mobile carrier unit to deliver the first container to a full container outbound portion. After the container includes all of the items in an order, the container may be determined to be full. In some instances, a full container may not be physically full. In other instances, a full container may be physically full. The full container outbound portion of the sortation system may be a conveyor belt or other portion of the sortation system to which containers that are outbound from the sortation system may be routed. The containers that are outbound may include sorted items. After full containers are removed from the sortation system, the container slot from which the full container was removed may be replaced with an empty container, which may then be associated with a different order identifier. For example, the computer system may cause a container elevator to move a container from an empty container inbound portion to the first mobile carrier unit. The empty container inbound portion may be an input queue or holding at which empty containers may be input or fed into the sortation system.

In some embodiments, instead of, or in addition to, determining that the first container comprises the items associated with the first order identifier, the computer system may determine that the container is full. A full container may include a certain predetermined set of items, or may be physically full. The computer system may then cause a mobile carrier unit to retrieve the second container after delivering the first item to the first container. For example, a mobile carrier unit, during the same trip through a container matrix, may first deliver an item, and may then retrieve a full container for delivery to the outbound portion to improve efficiency.

Figure 5:
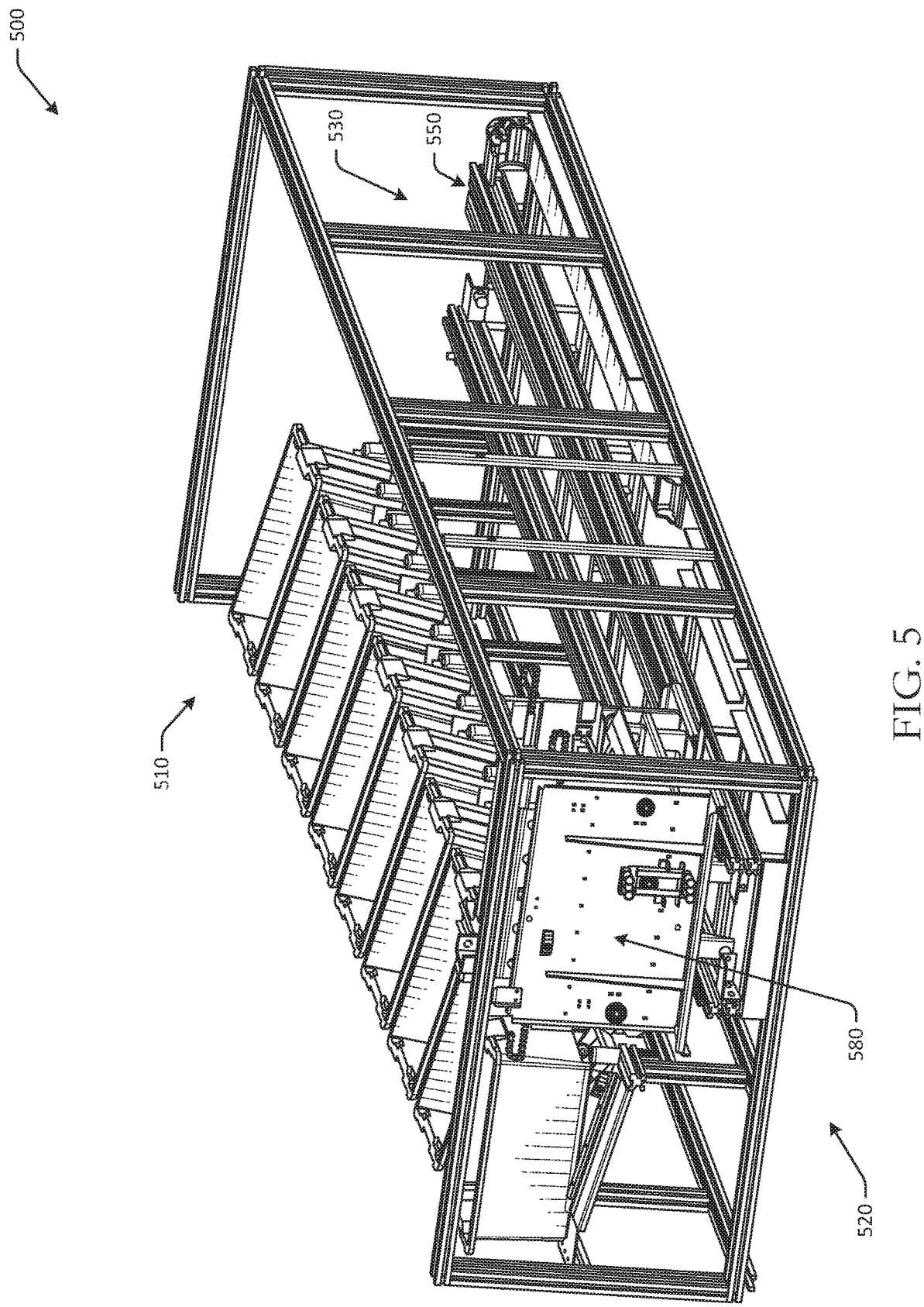
FIG. 5 is a schematic illustration of a sortation system with ramps in accordance with one or more embodiments of the disclosure.

FIG. 5 is a schematic illustration of a portion of a sortation system 500 with ramps in accordance with one or more embodiments of the disclosure. Other embodiments may include additional or fewer components. The illustration of FIG. 5 may not be to scale, and may not be illustrated to scale with respect to other figures. The sortation system illustrated in FIG. 5 may be the same sortation system discussed with respect to FIGS. 1-4.

In FIG. 5, the sortation system 500 may include a container matrix 510, an induction portion 520, an outbound portion 530, an empty container intake portion, one or more tracks, and one or more mobile carrier units 580. In the illustrated example, the sortation system 500 may be part of a sortation system having a length of about seventy feet and a width of about eight feet.

The container matrix 510 may be a modular rack system that includes one or more vertically spaced or horizontally spaced levels, where some or all of the levels may include container slots. The container matrix 510 may house containers, such as totes, bins, bags, or other containers, that can be used to hold sorted items, such as items that correspond to certain orders. The containers may be stored at one or more different angles. The container matrix 510 may include an array of containers with removable and/or rearrange-able container configurations. The containers may be of the same or different dimensions. The container matrix 510 may include one or more levels, such as a first level and a second level. The first level may include a first plurality of container slots configured to receive individual containers, and the second level may include a second plurality of container slots configured to receive individual containers. The first level may be an upper level or lower level with respect to the second level.

The induction portion 520 may be an induction point for items, such as products or packages, that are input at the sortation system 500 for sortation. The outbound portion 530 may be where containers that are full, or that include all of the items in an order, may be directed after completion of sortation. For example, containers that are ready to move to a different stage or portion of a fulfillment center may be retrieved from the container matrix 510 by one or more of the mobile carrier units 580 and delivered to the outbound portion 530. The outbound portion 530 may be configured to transport full containers out of the sortation system 500.

The empty container intake portion may be where empty containers are input to the sortation system 500. For example, as full or completed containers are removed from container slots at the container matrix 510, the container slots may be filled with empty containers. For example, one or more mobile carrier units may retrieve an empty container from the empty container intake portion and deliver the empty container to an empty container slot. In some embodiments, the mobile carrier unit may retrieve an empty container after delivering a completed container, such as by moving backwards or forwards along a track. Although the inbound portion 520, outbound portion 530, and empty container intake portion are illustrated in a certain arrangement in FIG. 5, other arrangements may be used. For example, the empty container intake portion may be placed on an opposite side of the inbound portion 520 relative to the outbound portion 530. The empty container intake portion may be configured to transport empty containers into the sortation system 500, or to feed empty containers into the sortation system 500. The induction portion 520, the outbound portion 530, and the empty container intake portion may optionally include conveyor belts, and may be disposed adjacent to each other.

The sortation system 500 may include one or more tracks. The tracks may be used by the mobile carrier units 580 to move between the respective portions of the sortation system 500 and the container matrix 510. For example, the mobile carrier unit 580 may move along a certain track or set of tracks to reach a first container, and along a different set of tracks to reach a second container. Tracks may lead to different levels of the container matrix 510. In FIG. 5, the sortation system 500 may include a first track 550. The tracks may be rails or other forms of tracks that guide the mobile carrier units 580. The tracks may be linear or open or closed loop. The mobile carrier units 580 may move unidirectionally or bidirectionally along the tracks. In one example, the mobile carrier units 580 may move in a counterclockwise direction about the tracks. The tracks may be disposed at different levels. For example, the first track 550 may be disposed at a first level, a second track may be disposed at a second level, a third track may be disposed at a third level, a fourth track 556 may be disposed at a fourth level, and so forth.

The mobile carrier units 580 may individually include one or more conveyor belts, such as cross-belt conveyors or other mechanical components, and may be configured to move along the respective tracks of the sortation system 500. The mobile carrier units 580 may be configured to perform various functions, such as retrieving items, depositing items into containers on the different levels of the container matrix 510, retrieving full containers from container slots, depositing empty containers into container slots, and other functions. The mobile carrier units 580 may be controlled by one or more computer systems or controllers. The mobile carrier units 580 may include at least two sidewalls on opposite sides of the mobile carrier unit. The sidewalls may be used to secure a payload. Some embodiments may not include sidewalls. Some embodiments may include one or more doors that can be opened or closed. For example, the mobile carrier unit may include a first door disposed transverse to the at least two sidewalls, where the mobile carrier unit is configured to automatically open and/or close the first door. In some instances, the first door, when in an open position, may form a chute that can be angled towards a container on a lower level. In some instances, the mobile carrier unit may include a second door disposed opposite the first door, where the mobile carrier unit is configured to automatically open and/or close the second door. Mobile carrier units that include multiple sidewalls and/or doors that serve as sidewalls may be used to secure various types of payloads, such as round balls or objects that may remain contained within the sidewalls during movement.

The mobile carrier units 580 may travel on the track system of the sortation system 500 with fully open, partially enclosed, or fully enclosed surfaces. For example, the mobile carrier units 580 may include one or more sidewalls to secure payloads. Individual tracks about which the mobile carrier units 580 may move can be configured in open or closed loops of the sortation system 500, such that the mobile carrier units 580 may be recirculated within the system and/or moved to a holding area (e.g., the queuing track, etc.). The tracks can also be layered vertically or horizontally based on the desired throughput from the sortation system 500, as well as footprint restrictions. In some embodiments, the tracks may include diverting features and/or mechanisms, such as switches, that may allow individual mobile carrier units 580 to be directed to different tracks as well as different elevations vertically. As a result, the sortation system 500 may provide a flexible track layout that may include bypass loops, divert loops, etc. and consequently the ability to queue mobile carrier units 580, level load different systems of the sortation system 500 based on demand and/or any bottlenecks that may be encountered.

In some embodiments, the mobile carrier units 580 and multi-layer/multi-level tracks may be used in conjunction with a high storage density modular rack system, or the container matrix 510, that is used to receive, hold, and/or dispatch different articles, as illustrated at least in FIG. 5. The mobile carrier units 580 may be universal and can accommodate payloads of various form factors (e.g., individual items, full and empty totes, boxes, etc.). The payload may be disposed within an open top box type enclosure with two fixed walls, and optionally two movable walls, that allow induction and deposition of the payload. The optional movable walls of the enclosure of the mobile carrier units 580 may be actuated mechanically by the mobile carrier units 580, or by one or more components on the track or the modular rack system. The mobile carrier units 580 may be configured to move with various means of propulsion (e.g., conveyors, linear induction motors, drive motors, drive rollers, etc.).

The mobile carrier units 580 may include, for example on a top surface, an article movement system, such as a powered belt that can move in one or more directions, such as a direction different from the direction of motion of the mobile carrier unit 580, tilting floors or units, etc. The article movement system may be configured to move items off the carrier and into a container (e.g., totes, bags, boxes, etc.). The containers may be held inside one or more cells of the modular storage racks. A quick change interface may be provided so that different article movement technologies can be attached to the individual mobile carrier units 580. The modular rack system can contain sensing and design features to ensure that any payload on the mobile carrier units 580 is properly deposited, held and either offloaded back to the mobile carrier units 580 or an alternative takeaway option for dispatch. Modularity in the modular rack system can include individual cells to hold articles or a column or row of cells that can be individually moved or a bank of columns or rows of cells that can be moved as a unit.

FIGS. 6-9 are schematic illustrations of an automated container retrieval and delivery system in different stages of operation in accordance with one or more embodiments of the disclosure. Other embodiments may include additional or fewer components. The illustrations of FIGS. 6-9 may not be to scale, and may not be illustrated to scale with respect to other figures.

Figure 6:
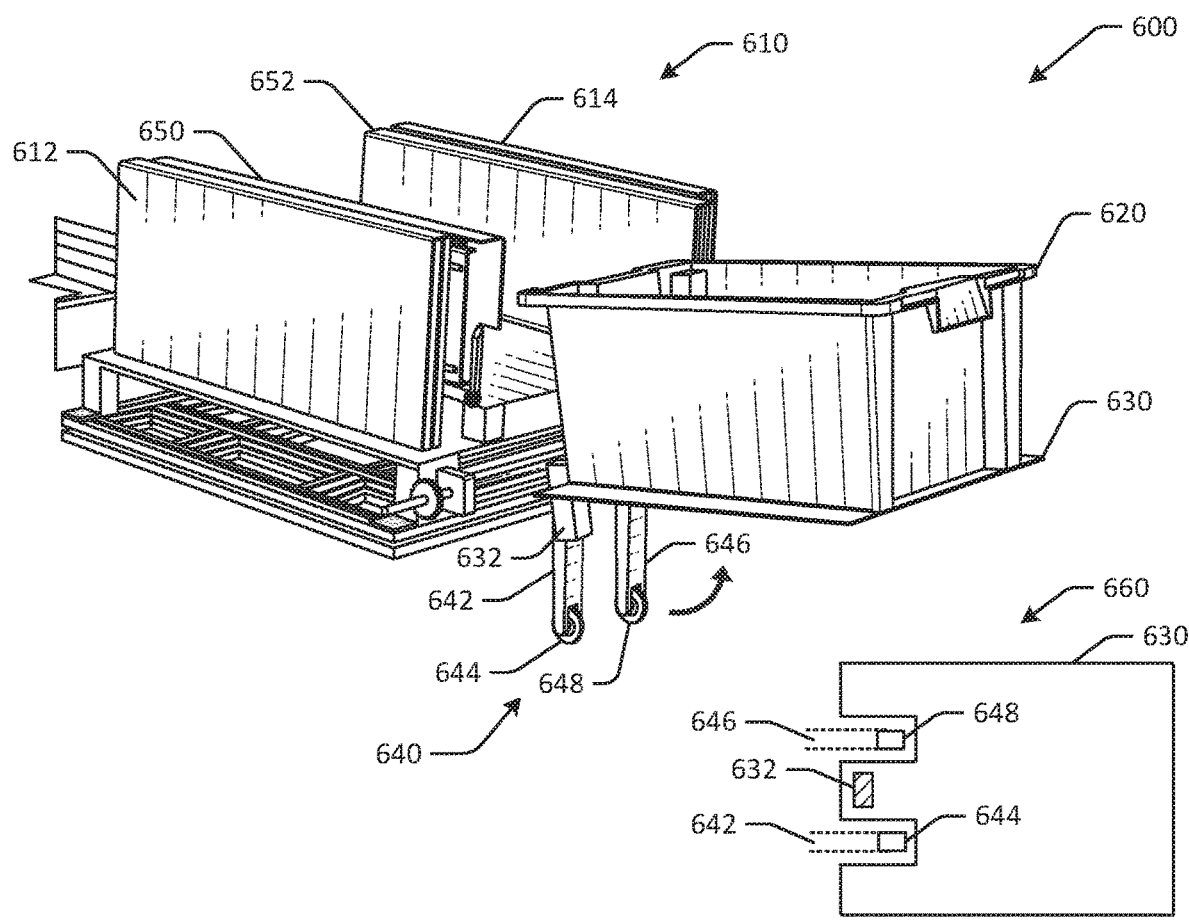
FIGS. 6-9 are schematic illustrations of an automated container retrieval and delivery system in different stages of operation in accordance with one or more embodiments of the disclosure.
Figure 6:
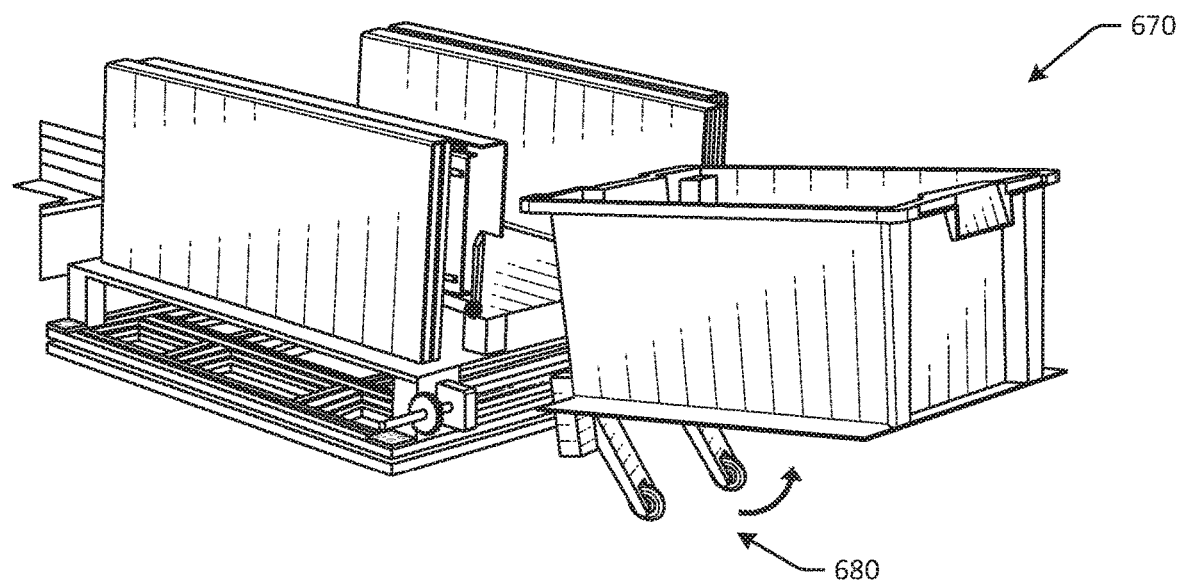

In FIG. 6, at a first instance 600, an automated container retrieval and delivery system 610 may be configured to retrieve a container 620. The automated container retrieval and delivery system 610 may be located at an item sortation system, a package sortation system, or other system. The automated container retrieval and delivery system 610 may be configured to move the container 620 from a first location to a second location. For example, the automated container retrieval and delivery system 610 may be configured to move the container 620 from a container slot in a container matrix to an outbound section (e.g., outbound container conveyor, etc.) of a sortation system. The container 620 may be a tote, tub, box, or other container. As illustrated in FIG. 6, the container 620 may be stored in the container matrix or other location at an angle. For example, container 620 may be stored angled towards the automated container retrieval and delivery system 610. The container 620 may be held in place on a platform or shelf 630 using a retention peg 632 or another suitable securing mechanism, such as a lip along an edge of the container matrix (e.g., the shelf on which the container 620 is located).

In some instances, the automated container retrieval and delivery system 610 may be an autonomous vehicle, or may be coupled to an autonomous vehicle. For example, the automated container retrieval and delivery system 610 may be a mobile carrier unit or shuttle. The automated container retrieval and delivery system 610 may include a conveyor belt that can be used to facilitate loading and/or unloading of items, such as the container 620, to and from the automated container retrieval and delivery system 610.

The automated container retrieval and delivery system 610 may include one or more sidewalls. For example, the automated container retrieval and delivery system 610 may include a first sidewall 612 and a second sidewall 614. The first sidewall 612 and the second sidewall 614 may form two open ends, or two open sides through which the container 620 can be loaded. In some embodiments, the first sidewall 612 and/or the second sidewall 614 may be telescoping sidewalls, in that a portion of the sidewall may telescope to extend outwards on either of the open sides of the automated container retrieval and delivery system 610. For example, a first telescoping arm 650 may be coupled to the first sidewall 612 (which may be fixed), and a second telescoping arm 652 may be coupled to the second sidewall 614 (which may be fixed).

The automated container retrieval and delivery system 610 may include one or more flipper arms 640 that may be used to reorient or reposition the container 620 from an angled position to a horizontal position. For example, the flipper arm(s) 640 may elevate an end or a side of the container 620 until the container 620 is level or otherwise substantially horizontal before or while the automated container retrieval and delivery system 610 attempts to retrieve the container 620. The flipper arms 640 may include a first rotatable arm 642 and a second rotatable arm 646. Other embodiments may include a single rotatable arm that may be wider in form (e.g., a paddle-like form, etc.). The first rotatable arm 642 and/or the second rotatable arm 646 may be configured to rotate outwards and upwards relative to a platform of the automated container retrieval and delivery system 610. For example, the first rotatable arm 642 and/or the second rotatable arm 646 may pivot or rotate upwards towards a lower surface of the container 620 in order to push the lower surface of the container 620 upwards, thereby leveling the container 620.

The first rotatable arm 642 may include a first wheel 644 disposed at a distal end of the first rotatable arm 642. The first wheel 644 may be coupled to a side of the first rotatable arm 642 or may be disposed between portions of the first rotatable arm 642 (e.g., in a yoke format, etc.). The second rotatable arm 646 may include a second wheel 648 disposed at a distal end of the second rotatable arm 646. The first wheel 644 and/or the second wheel 648 may contact a lower surface of the container 620, and may push the container 620 upwards. As the automated container retrieval and delivery system 610 retrieves the container 620 (e.g., by pulling the container 620 onto a platform of the automated container retrieval and delivery system 610, etc.), the container 620 may roll over the first wheel 644 and/or the second wheel 648. In some embodiments, the first wheel 644 and/or the second wheel 648 may be passive wheels, while in other embodiments, the first wheel 644 and/or the second wheel 648 may be drive wheels or rollers. The first rotatable arm 642 and/or the second rotatable arm 646 may be separated or offset from a front end of the automated container retrieval and delivery system 610, and may be disposed along a lower side of a platform of the automated container retrieval and delivery system 610. The first rotatable arm 642 may be disposed adjacent to the second rotatable arm 646.

As illustrated in schematic view 660, the first rotatable arm 642 and the second rotatable arm 646 may rotate upwards towards a lower surface of the container 620. The platform or shelf 630 on which the container 620 is located may include cutouts that provide access to the lower surface of the container 630. As a result, the flipper arms 640 may access the container 620. In some embodiments, the flipper arms 640 may be configured to raise the container 620 such that the lower surface of the container 620 clears the height of the retention peg 632.

The amount by which the flipper arms 640 raise the lower surface of the container 620 may be adjustable based at least in part on the angle at which the container 620 is positioned. For example, the greater the angle, the greater the upwards movement of the flipper arms 640 to compensate. In some embodiments, the amount of movement or rotation of the flipper arms 640 may be static, while in other embodiments, the amount of movement or rotation of the flipper arms 640 may be dynamically determined by a local or remote controller in communication with the automated container retrieval and delivery system 610.

At a second instance 670 in FIG. 6, the flipper arms 640 are illustrated in upwards motion 680 towards the lower surface of the container 620. The flipper arms 640 may be rotated or otherwise driven by a motor configured to drive one or both the first rotatable arm 642 and the second rotatable arm 646.

Figure 7:
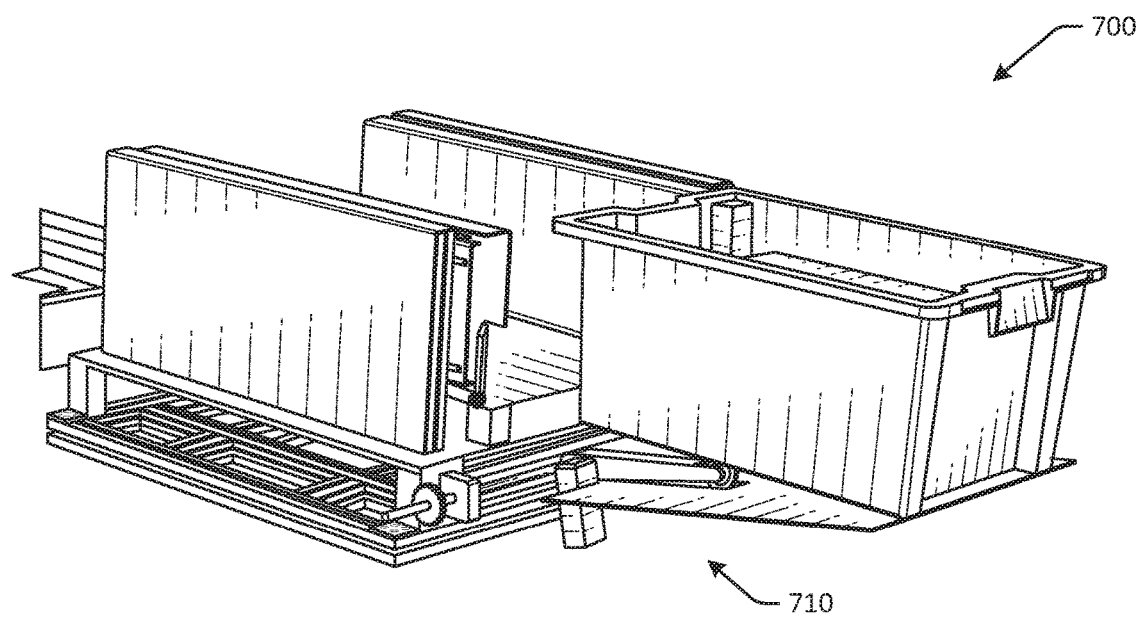
Figure 7:
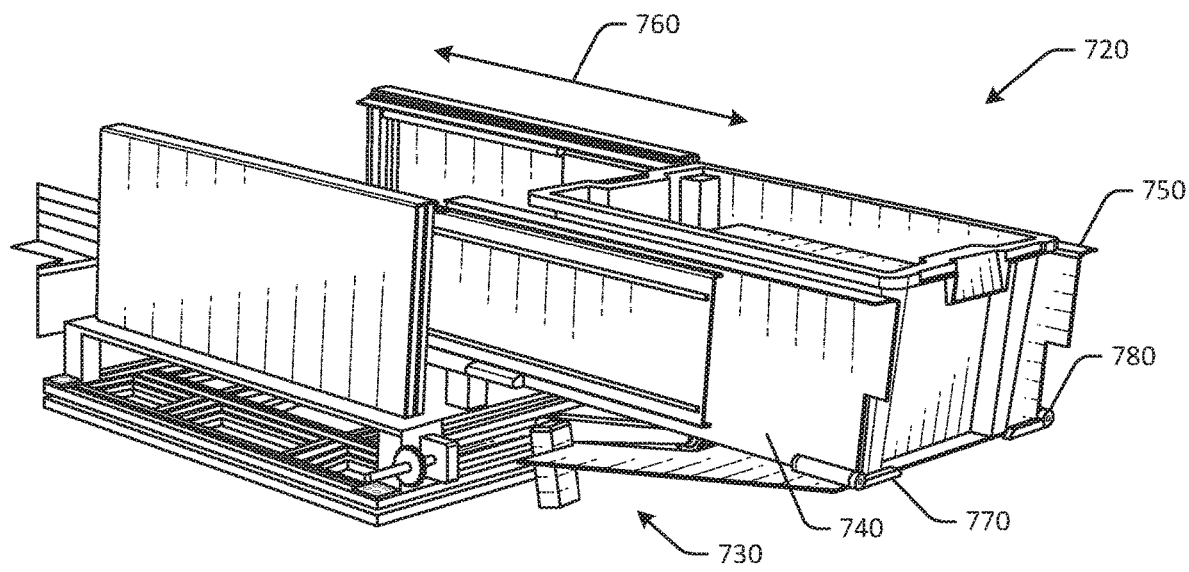

In FIG. 7, the automated container retrieval and delivery system 610 is depicted as the container retrieval process continues to be executed. At a third instance 700, the flipper arms 640 engage the lower surface of the container 620 and lift the container 620 into a horizontal position 710. At a fourth instance 720, the telescoping arms of the automated container retrieval and delivery system 610 may extend outward towards the container 620. For example, the telescoping arms may include a first portion 740 and a second portion 750 that extend past the end of the container 620. As the telescoping arms extend, the flipper arms may maintain contact with the lower surface of the container 620, thereby holding the container 620 in a horizontal position 730. The telescoping arms may be configured to move in either direction 760, so as to retrieve or deliver containers on either side of the automated container retrieval and delivery system 610. After the telescoping arms are extended beyond the end of the container 620 (which may or may not be full extension of the telescoping arms), a first rotating member 770 at an end of the first telescoping arm 740 may rotate or pivot from a vertical position to a horizontal position. Similarly, a second rotating member 780 at an end of the second telescoping arm 750 may rotate or pivot from a vertical position to a horizontal position. The first rotating member 770 and the second rotating member 780 may rotate towards each other in the horizontal position. The first rotating member 770 and the second rotating member 780 may be configured to contact the end or back sidewall of the container 620 when the container 620 is pulled toward the automated container retrieval and delivery system 610. The first rotating member 770 and the second rotating member 780 may be positioned at or near a bottom portion of the respective telescoping arms to provide a more secure grip on the container 620 during movement. The telescoping arms may be actuated using, for example, a timing belt arrangement (e.g., motorized pulley and timing belt to move the telescopic arrangement in cascaded manner, etc.), a pneumatic actuation (e.g., linear pneumatic cylinders to be actuated in a synchronous manner, etc.), or other type of actuation.

The automated container retrieval and delivery system 610 may therefore be a container handling system or container handling vehicle that includes an autonomous vehicle, a platform coupled to the autonomous vehicle, the first rotatable arm 642 disposed on a lower side of the platform, where the first rotatable arm 642 is offset from a front end of the platform, the first wheel 644 disposed at a distal end of the first rotatable arm 642, a second rotatable arm 646 disposed on the lower side of the platform adjacent to the first rotatable arm 642, a second wheel 648 disposed at a distal end of the second rotatable arm 646, and a motor configured to rotate the first rotatable arm 642 and/or the second rotatable arm 646 from a first position to a second position. The first position may be a default position, and may be a vertical or substantially vertical position (e.g., perpendicular to a central axis of the platform, etc.), and the second position may be a position at which a container to be retrieved is lifted to a horizontal position. The automated container retrieval and delivery system 610 may include a controller configured to control operation of the container handling system, and may be configured to raise a container from an angled position to a horizontal position, such that the container is in the horizontal position when the first rotatable arm and the second rotatable arm are in the second position. The second position may be adjustable by the controller based at least in part on an angle of the angled position of the container. The controller may be configured to cause the respective first telescoping arm and the second telescoping arm to extend outward from the container handling system or vehicle after the first rotatable arm and the second rotatable arm are in the second position. The container handling system may include the first telescoping arm disposed on an upper side of the platform, a first rotatable member disposed at a first end of the first telescoping arm, the first rotatable member configured to rotate about a central axis of the first telescoping arm from a vertical position to a horizontal position (e.g., rotate towards the opposite sidewall or telescoping arm, etc.), a second telescoping arm disposed on the upper side of the platform, and a second rotatable member disposed at a first end of the second telescoping arm, the second rotatable member configured to rotate about a central axis of the second telescoping arm from the vertical position to the horizontal position (e.g., rotate towards the opposite sidewall or telescoping arm, etc.).

In some embodiments, the first telescoping arm and the second telescoping arm may be configured to extend outward from the container handling system in a first direction and a second direction that is opposite the first direction, so as to facilitate retrieval and/or delivery of containers in either direction. In such embodiments, the container handling system may include a third rotatable member disposed at a second end of the first telescoping arm, the third rotatable member configured to rotate about the central axis of the first telescoping arm from the vertical position to the horizontal position (e.g., rotate towards the opposite sidewall or telescoping arm, etc.), and a fourth rotatable member disposed at a second end of the second telescoping arm, the fourth rotatable member configured to rotate about the central axis of the second telescoping arm from the vertical position to the horizontal position (e.g., rotate towards the opposite sidewall or telescoping arm, etc.).

Figure 8:
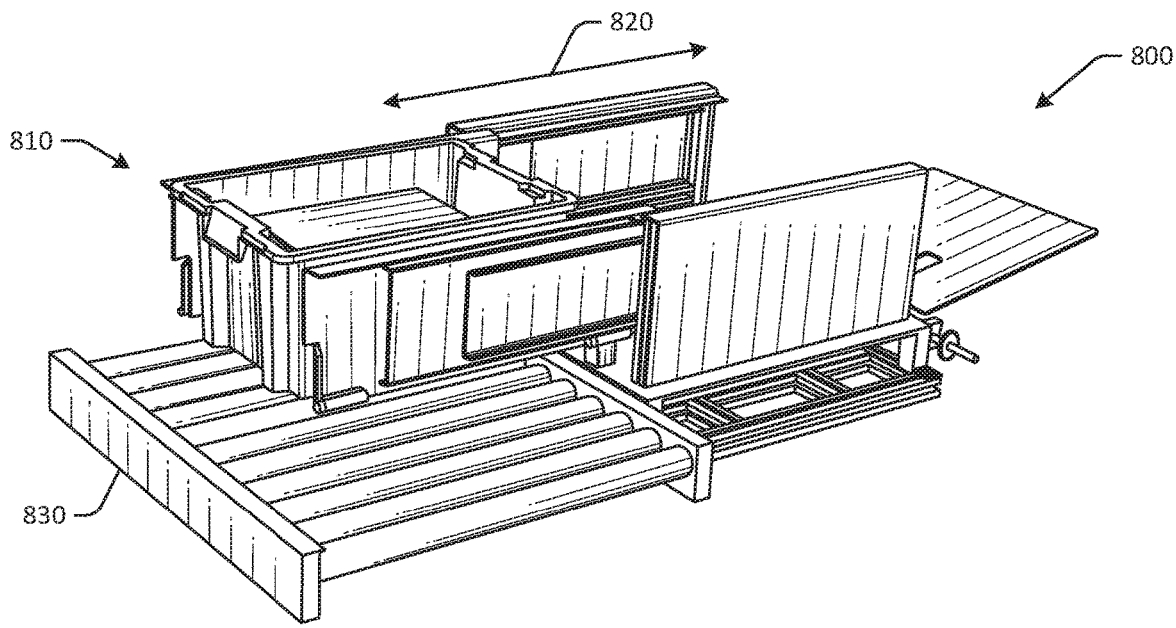
Figure 8:
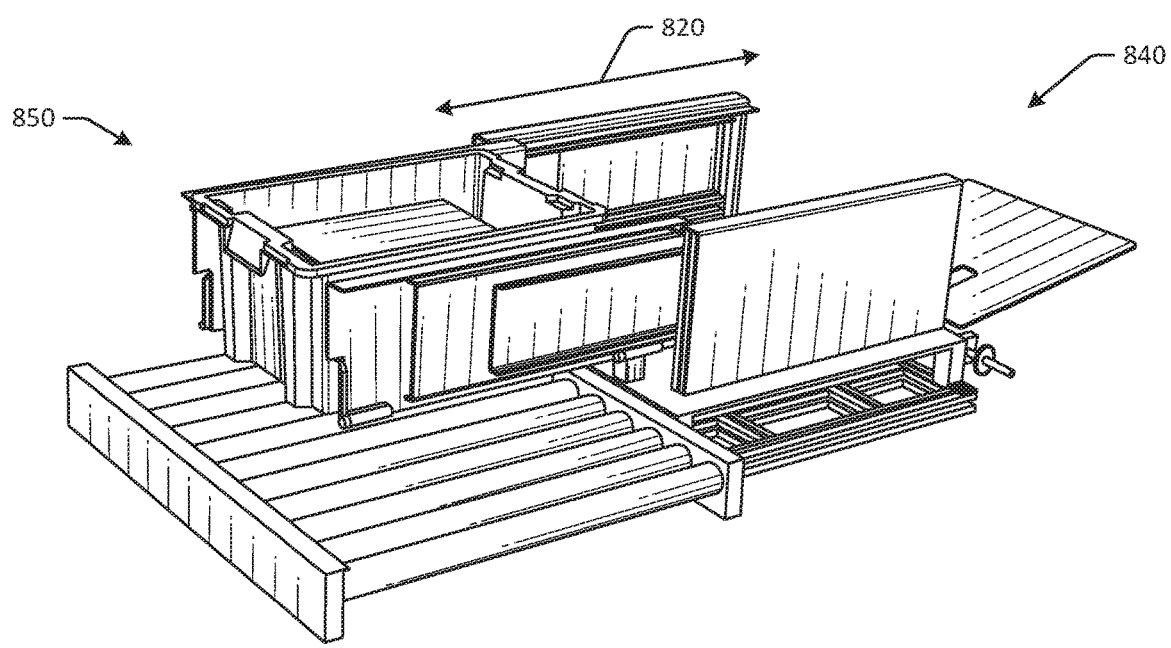
Figure 9:
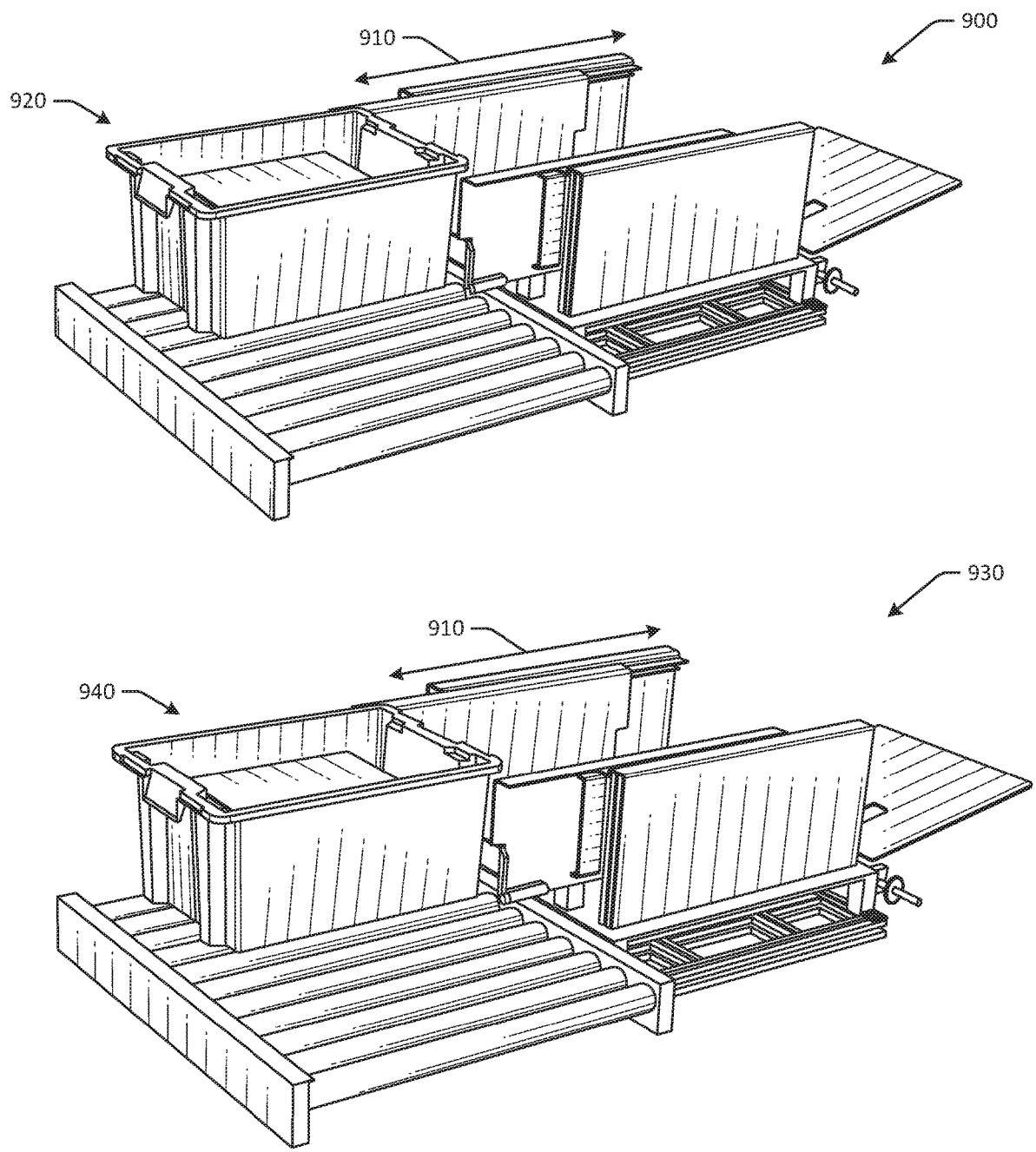

FIGS. 8-9 depict the delivery process for the automated container retrieval and delivery system 610. After retrieving the container 620, the automated container retrieval and delivery system 610 may transport the container 620 to its destination. At the destination, the automated container retrieval and delivery system 610 may deliver the container 620. At the time of retrieval and/or delivery, the container 620 may be empty or may have items inside.

At a first instance 800, the automated container retrieval and delivery system 610 may determine that the automated container retrieval and delivery system 610 is at the intended destination for the container 620. The intended destination may be a conveyor belt 830. To deliver or otherwise unload the container 620, the automated container retrieval and delivery system 610 may cause the telescoping arms to extend outward into an extended position 810 along either direction 820. As the telescoping arms extend, the rotatable members may push the container 620 off of the platform and onto the conveyor belt 830. In some embodiments, the telescoping arms may apply pressure to the sidewalls of the container 620 to maintain improved control of the container 620 during retrieval and/or delivery. At a second instance 840, after the telescoping arms are extended and the container 620 is disposed over the conveyor belt 830, the telescoping arms may begin retracting 850. In some embodiments, the rotating members may be in the horizontal position during transport and delivery, so as to improve control over the container 620. After the container 620 is at its destination, the rotating members may return to a vertical position (such as that illustrated in the second instance 840), to facilitate delivery of the container 620.

In FIG. 9, at a third instance 900, the telescoping arms may further retract back towards the automated container retrieval and delivery system 610, and the container may remain placed on the conveyor belt 920. Because the telescoping arms can move in both directions 910, delivery and retrieval can occur on either side of the automated container retrieval and delivery system 610. At a fourth instance 930, the container 940 may be fully separated 940 from the automated container retrieval and delivery system 610 and delivery may be complete.

Figure 10:
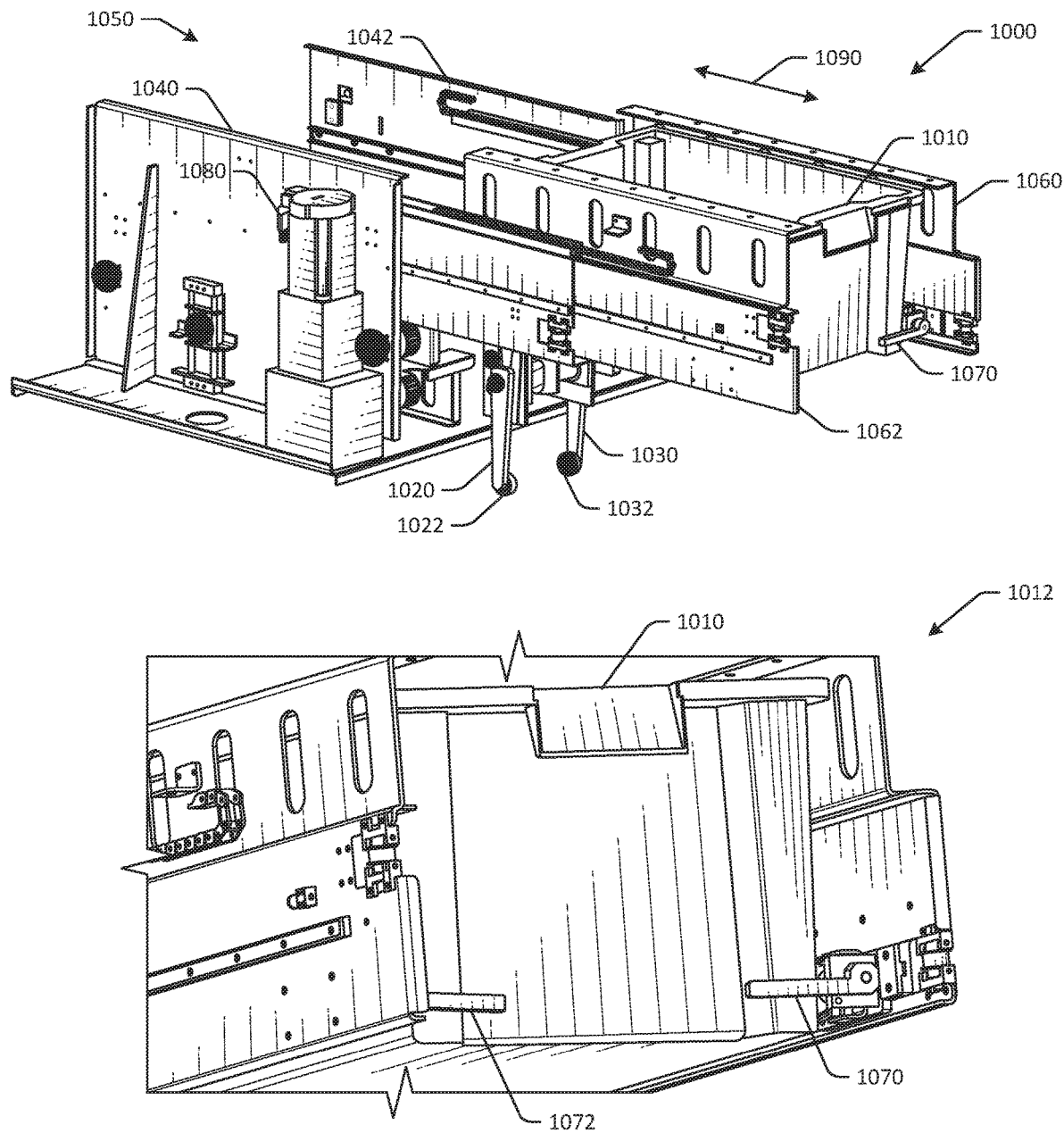
FIG. 10 is a schematic illustration of a perspective and detail views of an automated container retrieval and delivery system in accordance with one or more embodiments of the disclosure.

FIG. 10 is a schematic illustration of a perspective and detail views of an automated container retrieval and delivery system 1000 in accordance with one or more embodiments of the disclosure. Other embodiments may include additional or fewer components. The illustration of FIG. 10 may not be to scale, and may not be illustrated to scale with respect to other figures. The system illustrated in FIG. 10 may be the same system discussed with respect to FIGS. 6-9.

As illustrated in FIG. 10, the automated container retrieval and delivery system 1000 may be a container handling system. The automated container retrieval and delivery system 1000 may be configured to raise the container 1010 from an angled position to a horizontal position, retrieve the container 1010, and deliver the container 1010 to a destination. The automated container retrieval and delivery system 1000 may include a platform 1050 on which containers 1010 and/or other objects may be loaded. The automated container retrieval and delivery system 1000 may include a first rotatable arm 1020 disposed on a lower side of the platform 1050, where the first rotatable arm 1020 is offset from a front end of the platform 1050. The automated container retrieval and delivery system 1000 may include a first wheel 1022 disposed at a distal end of the first rotatable arm 1020. The automated container retrieval and delivery system 1000 may include a second rotatable arm 1030 disposed on the lower side of the platform adjacent to the first rotatable arm 1020, and a second wheel 1032 that may be disposed at a distal end of the second rotatable arm 1030.

The automated container retrieval and delivery system 1000 may include a motor configured to rotate the first rotatable arm 1020 and the second rotatable arm 1030 from a first position to a second position. The motor may be coupled to the first rotatable arm 1020 and the second rotatable arm 1030. In some instances, the motor may be disposed between the first rotatable arm 1020 and the second rotatable arm 1030 of the automated container retrieval and delivery system 1000. The first wheel 1022 and/or the second wheel 1032 may be configured to contact a lower surface of the container 1010 when the first rotatable arm 1020 is in the second position, and the container 1010 may be configured to roll over the first wheel 1022 and/or the second wheel 1032.

The automated container retrieval and delivery system 1000 may include a first sidewall 1040 and a second sidewall 1042. The sidewalls may be static. The automated container retrieval and delivery system 1000 may include telescoping arms that may be coupled to the respective sidewalls. For example, the automated container retrieval and delivery system 1000 may include a first telescoping arm 1062 disposed on an upper side of the platform 1050, and a second telescoping arm 1060 disposed on the upper side of the platform 1050. The first telescoping arm 1062 and the second telescoping arm 1060 may be configured to move along opposite sidewalls of the container 1010 when the container is in the horizontal position. The first telescoping arm 1062 and the second telescoping arm 1060 may be configured to move in both directions 1090. The telescoping arms may be driven by an independent motor 1080. A rack and pinion motor may be disposed adjacent to the independent motor 1080. In some embodiments, the respective telescoping arms may be coupled to a slideable sidewall, such that the slideable sidewalls move with the telescoping arms when extending and/or retracting.

Coupled to either or both ends of the respective telescoping arms may be rotating or pivotable members. For example, as illustrated in detail view 1012, a first rotatable member 1072 may be coupled to an end of the first telescoping arm 1062, and a second rotatable member 1070 may be coupled to an end of the second telescoping arm 1060. The respective rotating members may be configured to apply a push and/or pull force to a surface of the container 1010.

Figure 11:
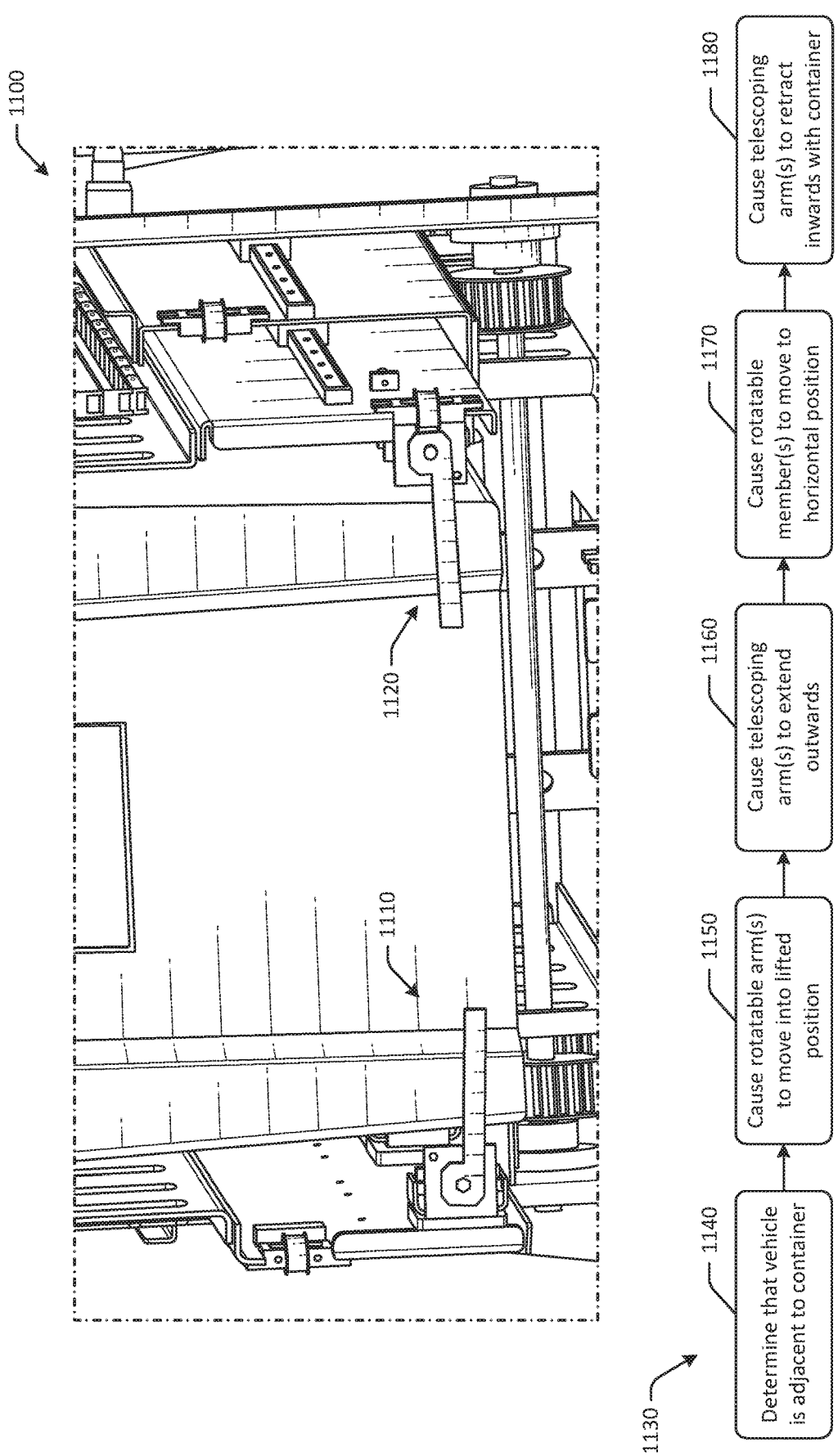
FIG. 11 is a schematic illustration of a detail view of an automated container retrieval and delivery system and example process flow in accordance with one or more embodiments of the disclosure.

FIG. 11 is a schematic illustration of a detail view of an automated container retrieval and delivery system 1100 and example process flow 1130 in accordance with one or more embodiments of the disclosure. Other embodiments may include additional or fewer components. The illustration of FIG. 11 may not be to scale, and may not be illustrated to scale with respect to other figures. The system illustrated in FIG. 11 may be the same system discussed with respect to FIGS. 6-10.

In FIG. 11, a first rotatable member 1100 may be disposed at a first end of a first telescoping arm, and may be configured to rotate about a central axis of the first telescoping arm from a vertical position to a horizontal position. The horizontal position is illustrated in FIG. 11. Similarly, a second rotatable member 1120 may be disposed at a first end of the second telescoping arm, and may be configured to rotate about a central axis of the second telescoping arm from the vertical position to the horizontal position, as illustrated in FIG. 11. The first rotatable member 1110 and the second rotatable member 1120 may be configured to secure a container in the horizontal position, and the first rotatable member 1110 and the second rotatable member 1120 may be in the vertical position while the first telescoping arm and the second telescoping arm are in motion.

To retrieve a container, the process flow 1130 may be executed, for example, by a local controller at the automated container retrieval and delivery system 1100 or by a remote computer system. To deliver a container, certain operations of the process flow 1130 may be executed in a reverse order.

At block 1140, the controller may determine that the vehicle (e.g., the automated container retrieval and delivery system 1100, etc.) is adjacent to the container for retrieval. At block 1150, the controller may cause the rotatable arms to move into a lifted position. For example, the controller may cause the first rotatable arm and the second rotatable arm to move to the second position. At block 1160, the controller may cause the telescoping arm(s) to extend outwards. For example, the controller may cause the first telescoping arm and the second telescoping arm to extend outwards from the platform towards the container. At block 1170, the controller may cause the rotatable member(s) to move to a horizontal position. For example, the controller may cause the first rotatable member and the second rotatable member to move to the horizontal position. At block 1180, the controller may cause the telescoping arm(s) to retract inwards with the container. For example, the controller may cause the first telescoping arm and the second telescoping arm to retract inwards to the platform. The controller may then determine that the container is loaded onto the platform, and may begin transport to the destination. For delivery, the telescoping arms may be caused to push the container outwards in conjunction with the rotating members, after which the telescoping arms may be retracted.

Figure 12:
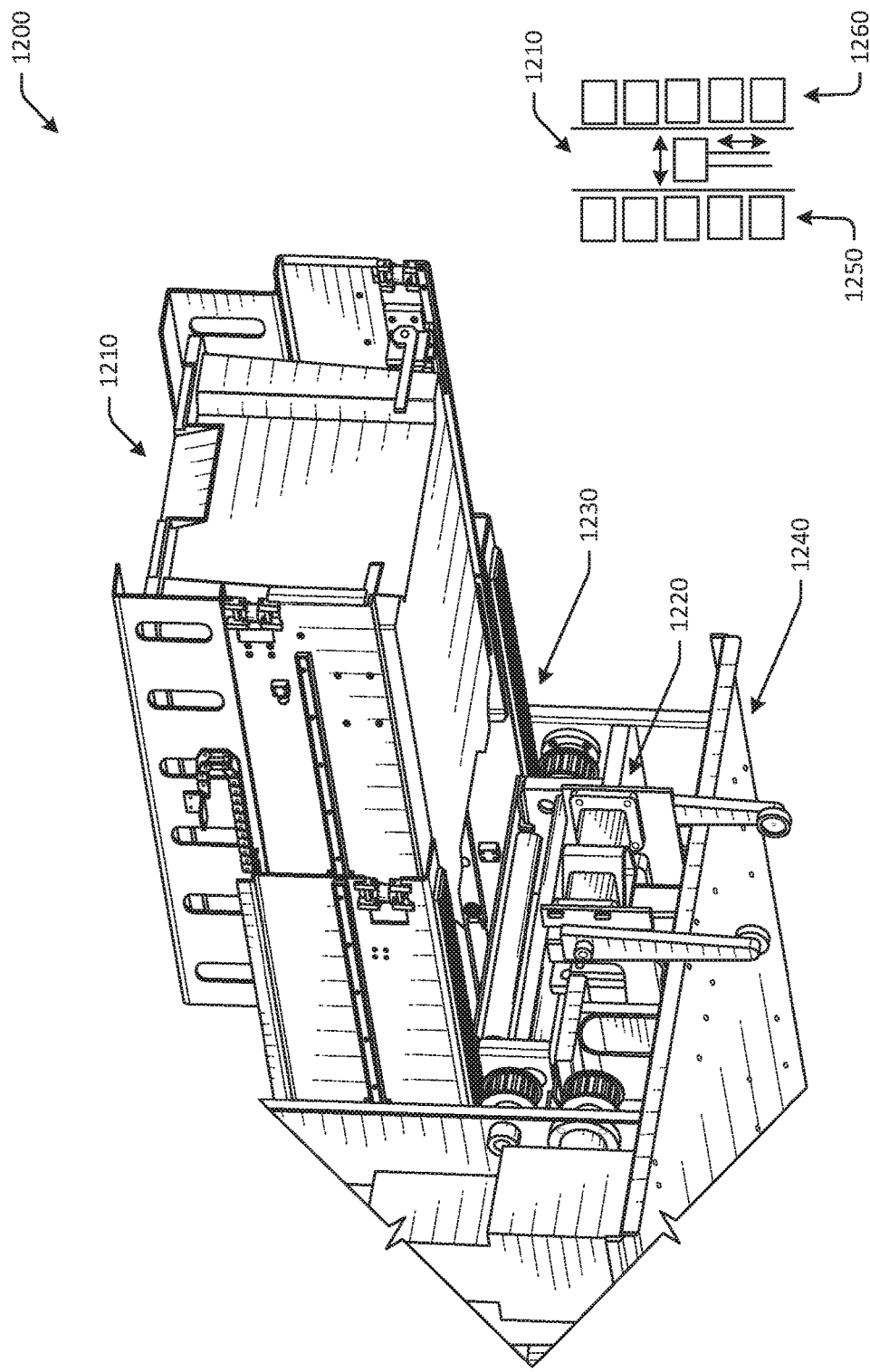
FIG. 12 is a schematic illustration of a portion of an automated container retrieval and delivery system and example use case in accordance with one or more embodiments of the disclosure.

FIG. 12 is a schematic illustration of a portion of an automated container retrieval and delivery system 1200 and example use case in accordance with one or more embodiments of the disclosure. Other embodiments may include additional or fewer components. The illustration of FIG. 12 may not be to scale, and may not be illustrated to scale with respect to other figures. The system illustrated in FIG. 12 may be the same system discussed with respect to FIGS. 6-11.

FIG. 12 depicts the automated container retrieval and delivery system 1200 in possession of a container 1210. During loading and unloading of the container 1210, a bottom surface 1230 may be exposed (e.g., the telescoping arms may have ledges to support edges of the bottom surface of the container 1210, etc.). A motor 1220 may be used to return flipper arms 1240 to a default position once the container 1210 is securely grasped by the automated container retrieval and delivery system 1200.

The automated container retrieval and delivery system 1200 may include, or be part of, a vehicle system, such as a shuttle, a mobile robot, or other vehicle system. For example, the automated container retrieval and delivery system 1200 may be coupled to a robotic arm as illustrated in schematic drawing 1210. The robotic arm may be coupled to a sidewall of the automated container retrieval and delivery system 1200. As a result, the robot and/or robotic arm can move along an aisle with a first side of containers 1250 and a second side of containers 1260, and can access containers on either side of the aisle. In such instances, the automated container retrieval and delivery system 1200 may act as an end effector for the robot and/or robotic arm.

One or more operations of the methods, process flows, or use cases of FIGS. 1-12 may have been described above as being performed by a user device, or more specifically, by one or more program module(s), applications, or the like executing on a device. It should be appreciated, however, that any of the operations of the methods, process flows, or use cases of FIGS. 1-12 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-12 may be described in the context of the illustrative devices, it should be appreciated that such operations may be implemented in connection with numerous other device configurations.

The operations described and depicted in the illustrative methods, process flows, and use cases of FIGS. 1-12 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-12 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 13:
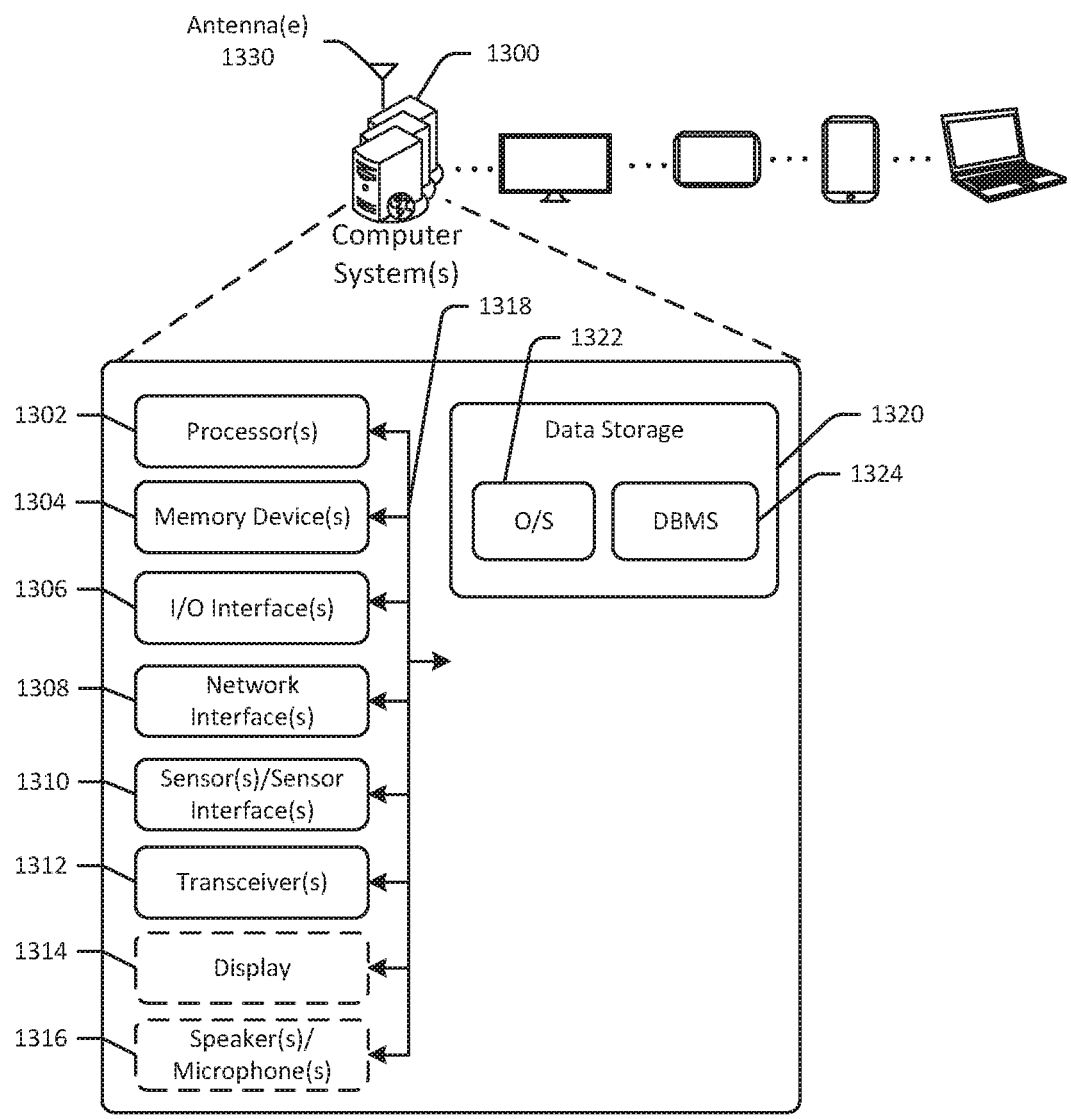
FIG. 13 schematically illustrates an example architecture of a computer system associated with an item sorting system in accordance with one or more embodiments of the disclosure.

FIG. 13 is a schematic block diagram of one or more illustrative computer system(s) 1300 in accordance with one or more example embodiments of the disclosure. The computer system(s) 1300 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1300 may correspond to an illustrative device configuration for the controller(s) or computer system(s) of FIGS. 1-12.

The computer system(s) 1300 may be configured to communicate with one or more servers, user devices, or the like. The computer system(s) 1300 may be configured to control mobile carrier unit and/or container retrieval and delivery systems.

The computer system(s) 1300 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1300 may include one or more processors (processor(s)) 1302, one or more memory devices 1304 (also referred to herein as memory 1304), one or more input/output (I/O) interface(s) 1306, one or more network interface(s) 1308, one or more sensor(s) or sensor interface(s) 1310, one or more transceiver(s) 1312, one or more optional display(s) 1314, one or more optional microphone(s) 1316, and data storage 1320. The computer system(s) 1300 may further include one or more bus(es) 1318 that functionally couple various components of the computer system(s) 1300. The computer system(s) 1300 may further include one or more antenna(e) 1330 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1318 may include at least one of a system bus, a memory bus, an address bus, or a message bus, and may permit the exchange of information (e.g., data (including computer-executable code), signaling, etc.) between various components of the computer system(s) 1300. The bus(es) 1318 may include, without limitation, a memory bus or a memory controller, a peripheral bus, an accelerated graphics port, and so forth. The bus(es) 1318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1304 of the computer system(s) 1300 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1320 may include removable storage and/or non-removable storage including, but not limited to, magnetic storage, optical disk storage, and/or tape storage. The data storage 1320 may provide non-volatile storage of computer-executable instructions and other data. The memory 1304 and the data storage 1320, removable and/or non-removable, are examples of computer-readable storage media (CRSM) as that term is used herein.

The data storage 1320 may store computer-executable code, instructions, or the like that may be loadable into the memory 1304 and executable by the processor(s) 1302 to cause the processor(s) 1302 to perform or initiate various operations. The data storage 1320 may additionally store data that may be copied to the memory 1304 for use by the processor(s) 1302 during the execution of the computer-executable instructions. Moreover, output data generated as a result of execution of the computer-executable instructions by the processor(s) 1302 may be stored initially in the memory 1304, and may ultimately be copied to the data storage 1320 for non-volatile storage.

More specifically, the data storage 1320 may store one or more operating systems (O/S) 1322; one or more database management systems (DBMS) 1324; and one or more program module(s), applications, engines, computer-executable code, scripts, or the like. Some or all of these module(s) may be sub-module(s). Any of the components depicted as being stored in the data storage 1320 may include any combination of software, firmware, and/or hardware. The software and/or firmware may include computer-executable code, instructions, or the like that may be loaded into the memory 1304 for execution by one or more of the processor(s) 1302. Any of the components depicted as being stored in the data storage 1320 may support functionality described in reference to corresponding components named earlier in this disclosure.

The data storage 1320 may further store various types of data utilized by the components of the computer system(s) 1300. Any data stored in the data storage 1320 may be loaded into the memory 1304 for use by the processor(s) 1302 in executing computer-executable code. In addition, any data depicted as being stored in the data storage 1320 may potentially be stored in one or more datastore(s) and may be accessed via the DBMS 1324 and loaded in the memory 1304 for use by the processor(s) 1302 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1302 may be configured to access the memory 1304 and execute the computer-executable instructions loaded therein. For example, the processor(s) 1302 may be configured to execute the computer-executable instructions of the various program module(s), applications, engines, or the like of the computer system(s) 1300 to cause or facilitate various operations to be performed in accordance with one or more embodiments of the disclosure. The processor(s) 1302 may include any suitable processing unit capable of accepting data as input, processing the input data in accordance with stored computer-executable instructions, and generating output data. The processor(s) 1302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1302 may be capable of supporting any of a variety of instruction sets.

Referring now to other illustrative components depicted as being stored in the data storage 1320, the O/S 1322 may be loaded from the data storage 1320 into the memory 1304 and may provide an interface between other application software executing on the computer system(s) 1300 and the hardware resources of the computer system(s) 1300. More specifically, the O/S 1322 may include a set of computer-executable instructions for managing the hardware resources of the computer system(s) 1300 and for providing common services to other application programs (e.g., managing memory allocation among various application programs). In certain example embodiments, the O/S 1322 may control execution of the other program module(s). The O/S 1322 may include any operating system now known or which may be developed in the future including, but not limited to, any server operating system, any mainframe operating system, or any other proprietary or non-proprietary operating system.

The DBMS 1324 may be loaded into the memory 1304 and may support functionality for accessing, retrieving, storing, and/or manipulating data stored in the memory 1304 and/or data stored in the data storage 1320. The DBMS 1324 may use any of a variety of database models (e.g., relational model, object model, etc.) and may support any of a variety of query languages. The DBMS 1324 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1300 is a mobile device, the DBMS 1324 may be any suitable lightweight DBMS optimized for performance on a mobile device.

Referring now to other illustrative components of the computer system(s) 1300, the input/output (I/O) interface(s) 1306 may facilitate the receipt of input information by the computer system(s) 1300 from one or more I/O devices as well as the output of information from the computer system(s) 1300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1300 or may be separate. The I/O devices may further include, for example, any number of peripheral devices such as data storage devices, printing devices, and so forth.

The I/O interface(s) 1306 may also include an interface for an external peripheral device connection such as universal serial bus (USB), FireWire, Thunderbolt, Ethernet port or other connection protocol that may connect to one or more networks. The I/O interface(s) 1306 may also include a connection to one or more of the antenna(e) 1330 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1300 may further include one or more network interface(s) 1308 via which the computer system(s) 1300 may communicate with any of a variety of other systems, platforms, networks, devices, and so forth. The network interface(s) 1308 may enable communication, for example, with one or more wireless routers, one or more host servers, one or more web servers, and the like via one or more networks.

The antenna(e) 1330 may include any suitable type of antenna depending, for example, on the communications protocols used to transmit or receive signals via the antenna(e) 1330. Non-limiting examples of suitable antennae may include directional antennae, non-directional antennae, dipole antennae, folded dipole antennae, patch antennae, multiple-input multiple-output (MIMO) antennae, or the like. The antenna(e) 1330 may be communicatively coupled to one or more transceivers 1312 or radio components to which or from which signals may be transmitted or received.

As previously described, the antenna(e) 1330 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1330 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1330 may be configured to transmit or receive radio frequency signals within any suitable frequency range forming part of the unlicensed portion of the radio spectrum.

The antenna(e) 1330 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1312 may include any suitable radio component(s) for—in cooperation with the antenna(e)

1330—transmitting or receiving radio frequency (RF) signals in the bandwidth and/or channels corresponding to the communications protocols utilized by the computer system(s) 1300 to communicate with other devices. The transceiver(s) 1312 may include hardware, software, and/or firmware for modulating, transmitting, or receiving—potentially in cooperation with any of antenna(e) 1330—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1312 may further include hardware, firmware, or software for receiving GNSS signals. The transceiver(s) 1312 may include any known receiver and baseband suitable for communicating via the communications protocols utilized by the computer system(s) 1300. The transceiver(s) 1312 may further include a low noise amplifier (LNA), additional signal amplifiers, an analog-to-digital (A/D) converter, one or more buffers, a digital baseband, or the like.

The sensor(s)/sensor interface(s) 1310 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1314 may be configured to output light and/or render content. The optional speaker(s)/microphone(s) 1316 may be any device configured to receive analog sound input or voice data.

It should be appreciated that the program module(s), applications, computer-executable instructions, code, or the like depicted in FIG. 13 as being stored in the data storage 1320 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1300, and/or hosted on other computing device(s) accessible via one or more networks, may be provided to support functionality provided by the program module(s), applications, or computer-executable code depicted in FIG. 13 and/or additional or alternate functionality. Further, functionality may be modularized differently such that processing described as being supported collectively by the collection of program module(s) depicted in FIG. 13 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 13 may be implemented, at least partially, in hardware and/or firmware across any number of devices.

It should further be appreciated that the computer system(s) 1300 may include alternate and/or additional hardware, software, or firmware components beyond those described or depicted without departing from the scope of the disclosure. More particularly, it should be appreciated that software, firmware, or hardware components depicted as forming part of the computer system(s) 1300 are merely illustrative and that some components may not be present or additional components may be provided in various embodiments. While various illustrative program module(s) have been depicted and described as software module(s) stored in the data storage 1320, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-12 may be performed by a device having the illustrative configuration depicted in FIG. 13, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-12 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-12 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container handling system comprising:
an autonomous vehicle;
a platform coupled to the autonomous vehicle;
a first rotatable arm disposed on a lower side of the platform, wherein the first rotatable arm is offset from a front end of the platform;
a first wheel disposed at a distal end of the first rotatable arm;
a second rotatable arm disposed on the lower side of the platform adjacent to the first rotatable arm;
a second wheel disposed at a distal end of the second rotatable arm;
a motor configured to rotate the first rotatable arm from a first position to a second position, wherein a central axis of the first rotatable arm is perpendicular to a central axis of the platform when the first rotatable arm is in the first position;
a first telescoping arm disposed on an upper side of the platform;
a first rotatable member disposed at a first end of the first telescoping arm, the first rotatable member configured to rotate about a central axis of the first telescoping arm from a vertical position to a horizontal position, wherein the first rotatable member is configured to grip a container when the first rotatable member is in the horizontal position;
a second rotatable member disposed at a second end of the first telescoping arm, wherein the second rotatable member is configured to grip the container when the second rotatable member is in the horizontal position;
a second telescoping arm disposed on the upper side of the platform;
a third rotatable member disposed at a first end of the second telescoping arm, the third rotatable member configured to rotate about a central axis of the second telescoping arm from the vertical position to the horizontal position, wherein the third rotatable member is configured to grip the container when the third rotatable member is in the horizontal position;
a fourth rotatable member disposed at a second end of the second telescoping arm, wherein the fourth rotatable member is configured to grip the container when the fourth rotatable member is in the horizontal position; and
a controller configured to control operation of the container handling system;
wherein the container handling system is configured to raise the container from an angled position to a horizontal position, and wherein the container is in the horizontal position when the first rotatable arm and the second rotatable arm are in the second position.

2. The container handling system of claim 1, wherein the autonomous vehicle is configured to move from a container slot at a container matrix to retrieve the container to an outbound container conveyor to deliver the container.

3. The container handling system of claim 1, wherein the controller is configured to:
determine that the autonomous vehicle is adjacent to the container;
cause the first rotatable arm and the second rotatable arm to move to the second position;
cause the first telescoping arm and the second telescoping arm to extend outwards from the platform;
cause the first rotatable member and the second rotatable member to move to the horizontal position;
cause the first telescoping arm and the second telescoping arm to retract inwards to the platform; and
determine that the container is loaded onto the platform.

4. A container handling system comprising:
a platform;
a first telescoping arm disposed on an upper side of the platform;
a first rotatable member disposed at a first end of the first telescoping arm and configured to rotate from a vertical position to a horizontal position, wherein the first rotatable member is configured to grip a container when the first rotatable member is in the horizontal position;
a second rotatable member disposed at a second end of the first telescoping arm and configured to rotate from a vertical position to a horizontal position, wherein the second rotatable member is configured to grip the container when the second rotatable member is in the horizontal position;
a first rotatable arm disposed on a lower side of the platform, wherein the first rotatable arm is offset from a front end of the platform;
a motor configured to rotate the first rotatable arm from a first position to a second position, wherein a central axis of the first rotatable arm is perpendicular to a central axis of the platform when the first rotatable arm is in the first position; and
a first wheel disposed at a distal end of the first rotatable arm;
wherein the container handling system is configured to raise the container from an angled position to a horizontal position, and wherein the container is in the horizontal position when the first rotatable arm is in the second position.

5. The container handling system of claim 4, further comprising:
a second rotatable arm disposed on the lower side of the platform adjacent to the first rotatable arm; and
a second wheel disposed at a distal end of the second rotatable arm;
wherein the motor is further configured to rotate the second rotatable arm from the first position to the second position.

6. The container handling system of claim 4, wherein the first wheel is configured to contact a lower surface of the container when the first rotatable arm is in the second position, and the container is configured to roll over the first wheel.

7. The container handling system of claim 4, further comprising:
a second telescoping arm disposed on the upper side of the platform;
wherein the first telescoping arm and the second telescoping arm are configured to move along opposite sidewalls of the container when the container is in the horizontal position.

8. The container handling system of claim 7, further comprising:
a third rotatable member disposed at a first end of the second telescoping arm, the third rotatable member configured to rotate about a central axis of the second telescoping arm from a vertical position to a horizontal position;
wherein the first rotatable member, the second rotatable member, and the third rotatable member are configured to simultaneously secure the container when the container is in the horizontal position, and the third rotatable member is in the vertical position while the first telescoping arm and the second telescoping arm are in motion.

9. The container handling system of claim 7, wherein the first telescoping arm is coupled to a first slideable sidewall, and the second telescoping arm is coupled to a second slideable sidewall.

10. The container handling system of claim 7, wherein the first telescoping arm and the second telescoping arm are configured to extend outward from the container handling system in a first direction and a second direction that is opposite the first direction.

11. The container handling system of claim 10, further comprising:
a fourth rotatable member disposed at a second end of the second telescoping arm, the fourth rotatable member configured to rotate about the central axis of the second telescoping arm from the vertical position to the horizontal position.

12. The container handling system of claim 4, wherein the second position is adjustable based at least in part on an angle of the angled position of the container.

13. The container handling system of claim 4, wherein the container handling system is coupled to an autonomous shuttle.

14. A container handling vehicle comprising:
a platform;
a first telescoping arm disposed on an upper side of the platform;
a first rotatable member disposed at a first end of the first telescoping arm and configured to rotate from a vertical position to a horizontal position, wherein the first rotatable member is configured to grip a container when the first rotatable member is in the horizontal position;
a second rotatable member disposed at a second end of the first telescoping arm and configured to rotate from a vertical position to a horizontal position, wherein the second rotatable member is configured to grip the container when the second rotatable member is in the horizontal position;
a first rotatable arm disposed on a lower side of the platform, the first rotatable arm comprising a first wheel;
a second rotatable arm disposed adjacent to the first rotatable arm, the second rotatable arm comprising a second wheel;
a motor configured to rotate the first rotatable arm and the second rotatable arm from a first position to a second position, wherein a central axis of the first rotatable arm is perpendicular to a central axis of the platform when the first rotatable arm is in the first position; and
a controller configured to control operation of the first rotatable arm and the second rotatable arm;
wherein the container handling vehicle is configured to raise the container from an angled position to a horizontal position, and wherein the container is in the horizontal position when the first rotatable arm and the second rotatable arm are in the second position.

15. The container handling vehicle of claim 14, further comprising:
a second telescoping arm disposed on the upper side of the platform;
wherein the first telescoping arm and the second telescoping arm are configured to move along opposite sidewalls of the container when the container is in the horizontal position.

16. The container handling vehicle of claim 15, wherein the controller is configured to cause the first telescoping arm and the second telescoping arm to extend outward from the container handling vehicle after the first rotatable arm and the second rotatable arm are in the second position.

17. The container handling vehicle of claim 15, wherein the first rotatable member and the second rotatable member are configured to simultaneously secure the container when the container is in the horizontal position, and are in the vertical position while the first telescoping arm and the second telescoping arm are in motion.

18. The container handling vehicle of claim 14, wherein the second position is adjustable by the controller based at least in part on an angle of the angled position of the container.

* * * * *